(12) United States Patent
Jeuk et al.

(10) Patent No.: US 11,979,375 B2
(45) Date of Patent: May 7, 2024

(54) CONTEXT-AWARE SECURE ACCESS SERVICE EDGE (SASE) ENGINE

(71) Applicant: Cisco Technology, Inc., San Jose, CA (US)

(72) Inventors: Sebastian Jeuk, Munich (DE); David Hanes, Lewisville, NC (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 17/219,157

(22) Filed: Mar. 31, 2021

(65) Prior Publication Data

US 2022/0321534 A1 Oct. 6, 2022

(51) Int. Cl.
*H04L 9/40* (2022.01)
(52) U.S. Cl.
CPC ...... *H04L 63/0263* (2013.01); *H04L 63/0236* (2013.01); *H04L 63/0876* (2013.01); *H04L 63/102* (2013.01); *H04L 63/20* (2013.01)
(58) Field of Classification Search
CPC . H04L 63/0263; H04L 63/0236; H04L 63/08; H04L 63/76; H04L 63/102; H04L 63/20; H04L 41/5009; H04L 41/40
See application file for complete search history.

(56) References Cited

U.S. PATENT DOCUMENTS

| | | |
|---|---|---|
| 2013/0035063 A1 | 2/2013 | Fisk et al. |
| 2013/0254831 A1 | 9/2013 | Roach et al. |
| 2015/0188949 A1* | 7/2015 | Mahaffey ............ H04L 41/0894 726/1 |
| 2017/0201545 A1* | 7/2017 | Nicodemus ........... H04L 63/102 |
| 2018/0063164 A1 | 3/2018 | Balasubramanian et al. |
| 2018/0351806 A1 | 12/2018 | Mohanram et al. |
| 2019/0215308 A1* | 7/2019 | Feyzibehnagh ..... H04L 63/0428 |

(Continued)

OTHER PUBLICATIONS

International Preliminary Report on Patentability dated Oct. 12, 2023 for PCT Application No. PCT/US22/22563, "Context-Aware Secure Access Service Edge (SASE) Engine", 8 pages.

(Continued)

*Primary Examiner* — Khoi V Le
(74) *Attorney, Agent, or Firm* — Lee & Hayes P.C.

(57) ABSTRACT

Techniques for a context-aware secure access service edge (SASE) engine for generating security profile(s) associated with endpoint device(s) accessing the network and using the security profile(s) to evaluate a traffic flow from the endpoint device(s). The SASE engine may execute on an edge device of a computing resource network and may be configured to maintain a security profile database including an endpoint security profile mapping. Endpoint device(s) accessing the network may share endpoint, application, and/or user specific information with the SASE engine so that the SASE engine may generate a security profile specific to the endpoint, application, and/or user. Additionally, an enterprise network, associated with endpoint device(s) accessing the network, may provide default SASE security profile templates to the SASE engine. Further, a feedback loop may be established between the SASE engine and the endpoint device(s), enabling the SASE engine with the ability to autonomously and dynamically update security profiles.

20 Claims, 12 Drawing Sheets

(56) References Cited

U.S. PATENT DOCUMENTS

| | | |
|---|---|---|
| 2020/0067951 A1 | 2/2020 | Dwyer et al. |
| 2020/0097667 A1 | 3/2020 | Ford |
| 2020/0358780 A1 | 11/2020 | Anbalagan |

OTHER PUBLICATIONS

PCT Search Report and Written Opinion dated Jul. 20, 2022 for PCT Application No. PCT/US22/22563, "Context-Aware Secure Access Service Edge (SASE) Engine", 9 pages.

* cited by examiner

FIG. 4A

ENDPOINT SPECIFIC SASE SECURITY PROFILE

```
HTTPS(USER:USER_A) {
  URL: wwwin.cisco.com
  SECURITY {
    SSL
    MFA
    VPNtoDC
    METADATA {
      TIMEOUT
      ...
    }
  }
  URL:www.google.com
  SECURITY {
    DNS Security
    SSL
  }
}
```

DEFAULT SASE SECURITY PROFILE

```
VPNtoDC(USER:ALL) {
  SECURITY {
    IPSEC
    KEY_LENGTH
    ...
    METADATA {
      TIMEOUT
      ...
    }
  }
}
```

410

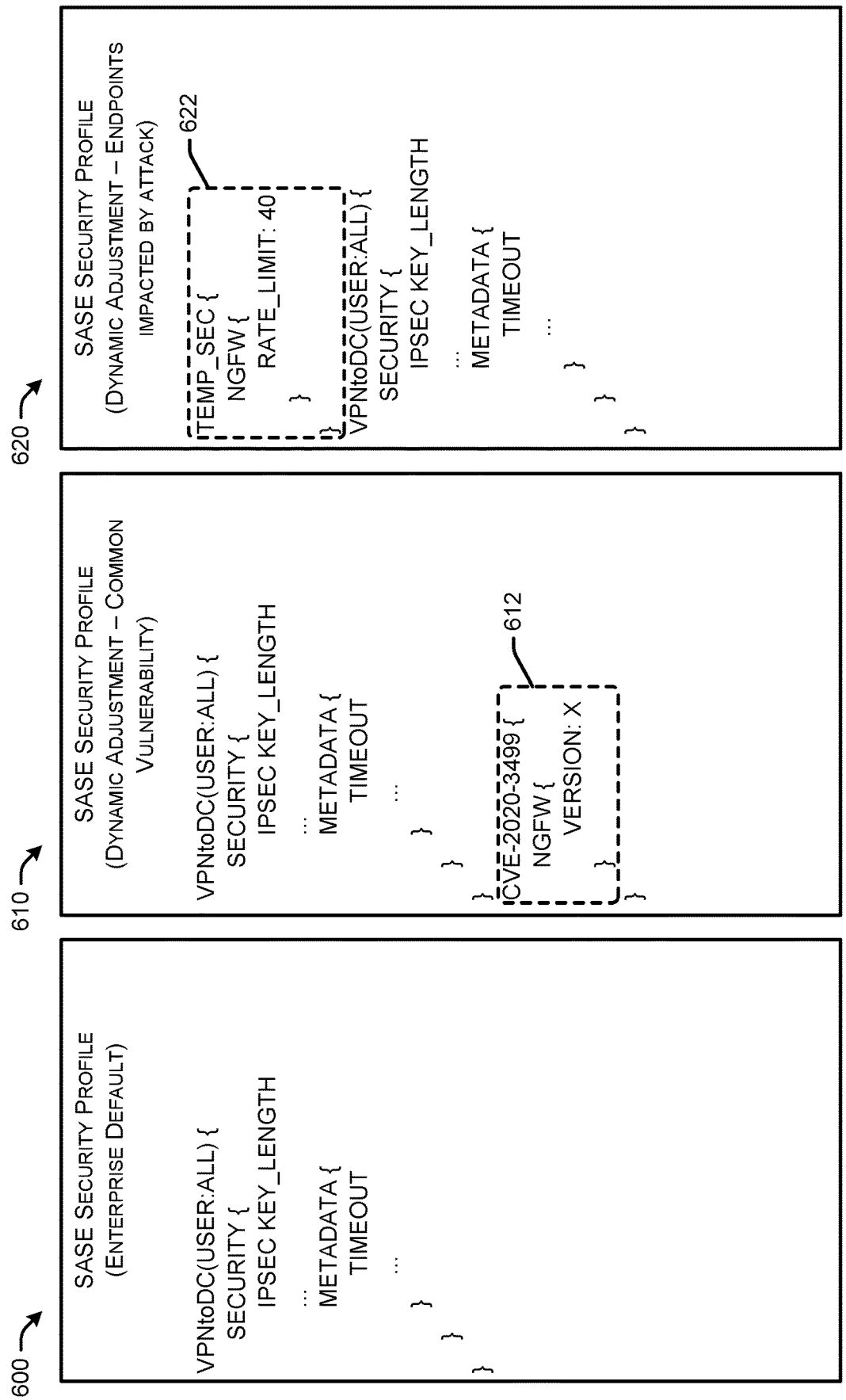

US 11,979,375 B2

CONTEXT-AWARE SECURE ACCESS SERVICE EDGE (SASE) ENGINE

TECHNICAL FIELD

The present disclosure relates generally to using a context-aware secure access service edge (SASE) engine for generating a security profile associated with an endpoint device and using the security profile to evaluate a traffic flow from the endpoint device.

BACKGROUND

Service providers offer computing-based services, or solutions, to provide users with access to computing resources to fulfill users' computing resource needs without having to invest in and maintain computing infrastructure required to implement the services. These service providers often maintain networks of data centers which house servers, routers, and other devices that provide computing resources to users such as compute resources, networking resources, storage resources, database resources, application resources, and so forth. The solutions offered by service providers may include a wide range of services that may be fine-tuned to meet a user's needs. The security access service edge (SASE) framework has been employed to deliver security as a service at the edge of a network and streamlines the way security is delivered to any type of endpoint at the edge. However, a single security approach per user is no longer sufficient and won't provide the most optimal security capabilities to support such solutions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 4A and 4B collectively illustrate an example endpoint specific SASE security profile configuration generated by a SASE engine using endpoint information received from the endpoint and an example default SASE security profile configuration generated by a SASE engine using a default security profile received from an enterprise network.

FIGS. 6A-6C illustrate an example default SASE security profile configuration, an example SASE security profile configuration with dynamic adjustment for common vulnerabilities, and an example SASE security profile configuration with dynamic adjustment for endpoints impacted by an attack.

DESCRIPTION OF EXAMPLE EMBODIMENTS

Overview

Figure 1:
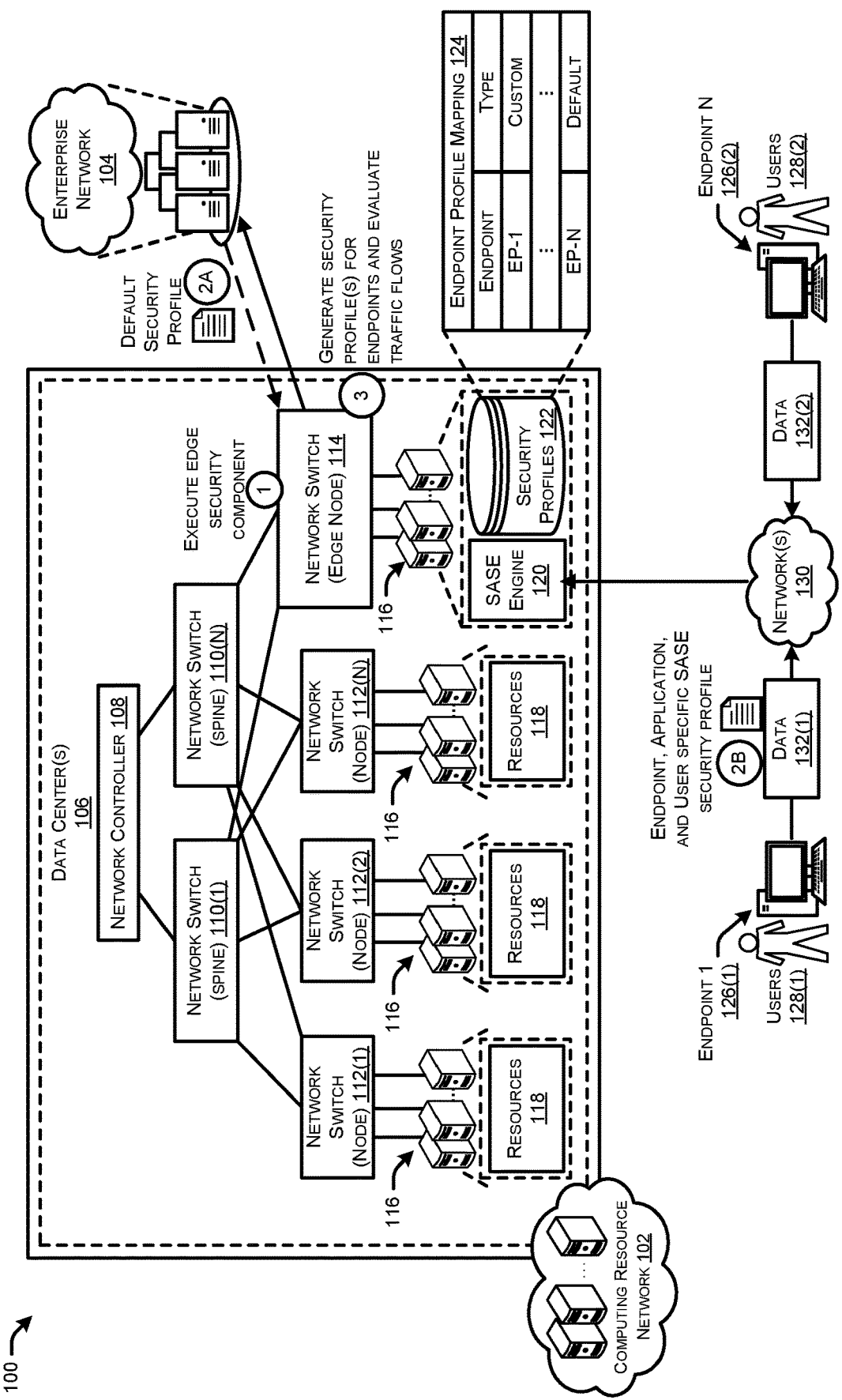
FIG. 1 illustrates a system-architecture diagram of an example flow for a computing resource network utilizing a context-aware SASE engine executing on a network edge device associated with the network to generate a security profile based on endpoint information received from and specific to an endpoint device accessing the network or a default security profile received from an enterprise network device and using such security profiles to evaluate a traffic flow from associated endpoint devices.

This disclosure describes a method for a context-aware SASE engine executing on a network edge device associated with a network to generate a security profile based on endpoint information received from and specific to an endpoint device accessing the network or a default security profile received from an enterprise network device and using such security profiles to evaluate a traffic flow from associated endpoint devices. The method includes executing an edge security component on an edge network device of a network. Additionally, or alternatively, the method includes receiving endpoint information from an endpoint device accessing the network. Additionally, or alternatively, the method includes generating a security profile associated with the endpoint device. Additionally, or alternatively, generating the security profile associated with the endpoint device may be based at least in part on the endpoint information. Additionally, or alternatively, the method includes evaluating a traffic flow from the endpoint device using the security profile.

Additionally, or alternatively, the method includes executing an edge security component on an edge network device of a network. Additionally, or alternatively, the method includes receiving a default security profile from an enterprise device associated with the network. Additionally, or alternatively, the default security profile may comprise a default set of security functions. Additionally, or alternatively, the method includes generating a security profile associated with an endpoint device accessing the network. Additionally, or alternatively, generating the security profile associated with the endpoint device accessing the network may be based at least in part on the default security profile. Additionally, or alternatively, the method includes evaluating a traffic flow from the endpoint device using the security profile.

Additionally, or alternatively, the method includes executing an edge security component on an edge network device of a network. Additionally, or alternatively, the method includes generating a security profile associated with an endpoint device accessing the network. Additionally, or alternatively, the method includes evaluating a traffic flow from the endpoint device using the security profile.

Additionally, the techniques described herein may be performed by a system and/or device having non-transitory computer-readable media storing computer-executable instructions that, when executed by one or more processors, performs the method described above.

EXAMPLE EMBODIMENTS

The usefulness of solutions offered by service providers has resulted in a rapid increase in cloud computing offering a wide range of services that may be fined-tuned to meet a user's needs. For example, security access service edge (SASE), as a framework to deliver security as a service at the edge of a network, streamlines the way security is delivered to any type of endpoint at the edge. However, a single security approach per user is no longer sufficient and won't provide the most optimal security capabilities specific to an endpoint, an application executing on an endpoint, and/or a tenant occupying an endpoint. As such, there is a need to offer security as a service specific to a tenant, application, endpoint, and/or any combination thereof.

This disclosure describes techniques for a service provider network to utilize a context-aware SASE engine that autonomously and dynamically adjusts security on a contextual basis. For example, a user device, joining a computing resource network in the edge, receives the standard security capabilities for the network. Throughout the lifecycle of the user device, the security mechanisms provided will have to change both dynamically and autonomously to adapt to its behavior and continuous security needs. As such, the edge no longer simply provides a single security approach that fit all endpoints (often based on a set of physical or centralized security functions). The context-aware SASE engine associated with the computing resource network may enable tenant and application security specific to the lifecycle of an endpoint or a user in the edge. For example, the context-aware SASE may be configured such that a tenant using a user device in the edge has a first security profile for a first application and second security profile for a second application. Thus, enabling the necessary flexibility in the edge to provide security on-demand autonomously and dynamically, tenant and application specific, while also influenced by a set of metadata information and the lifecycle of the endpoint and/or user.

An example computing resource network may comprise one or more network components, such as, for example, one or more network controller(s), one or more network spine switch(es), and/or one or more network switch(es), also referred to as node(s). In some examples, the context-aware SASE engine may be deployed at various locations in the computing resource network, such as, for example, network components (i.e., spine switch(es), leaf switch(es), node(s), etc.), endpoints associated with the network, and/or any other device(s) and/or node(s) associated with the network. Additionally, or alternatively, the SASE engine may be configured as a software agent executing on any one of the network components associated with the computing resource network. For example, the SASE engine may be deployed at an edge node of the computing resource network. In some examples, the edge node may be configured to communicate with one or more enterprise network(s) via one or more network(s). Additionally, or alternatively, an edge node may be configured to execute and/or maintain the SASE engine and/or a security profiles datastore. In some examples, the security profiles data store may comprise an endpoint table mapping, where endpoints associated with the edge node may be mapped to corresponding security profiles (i.e., enterprise default security profiles and/or custom endpoint security profiles).

Take, for example, an enterprise having an enterprise network in communication with a computing resource network as described herein. Such an enterprise may have various users accessing the computing resource network via one or more endpoints, such as, for example, user devices. In such an example, when a new endpoint connects to the computing resource network, via an edge node of the computing resource network, the SASE engine associated with the edge node may be configured to generate a security profile associated with the endpoint. The SASE engine may generate a security profile based at least partly on data received from the enterprise network, a default security profile associated with the computing resource network, contextual endpoint information, and/or any combination thereof. Additionally, or alternatively, the SASE engine may be configured to store a mapping between one or more security profiles and the endpoint. In some examples, the SASE engine may be configured to evaluate a traffic flow associated with the endpoint based at least partly on the security profile associated with the endpoint. Additionally, or alternatively, the SASE engine may be configured to evaluate the traffic flow associated with the endpoint based on various security profiles associated with the endpoint, such that the SASE engine may be configured to autonomously select between security profiles associated with the endpoint, based on contextual data associated with the endpoint, an application executing on the endpoint, a tenant associated with the endpoint, and/or any combination thereof.

As previously mentioned, the SASE engine may generate a security profile in a number of ways. In some examples, the SASE engine may generate a security profile associated with an endpoint based on a default security profile received from an enterprise network device associated with the endpoint. For example, upon determination of a new endpoint connecting to the computing resource network, the SASE engine may receive a default security profile from an enterprise device of an enterprise network associated with the endpoint. In some examples, the default security profile may comprise a basic set of information relevant to the specific edge cloud and/or branch of the enterprise. For example, the enterprise network may be configured to exchange data with the SASE engine and describe standard security functions that each endpoint, application, and/or tenant should receive, describe traffic patterns associated with the endpoint, and/or inform the SASE engine about the negotiation level. The SASE engine may then utilize the default security profile and/or the additional data received from the enterprise network to generate a security profile for the endpoint. The SASE engine may also be configured to store the security profile in a database including a mapping between the security profile and the endpoint.

Additionally, or alternatively, the SASE engine may generate a security profile associated with an endpoint based on endpoint information received from the endpoint. For example, the SASE engine may receive endpoint information from the endpoint. In some examples, the endpoint information may comprise a security profile that is specific to the endpoint, an application that is executing on the endpoint, and/or the tenant and/or user associated with the endpoint. Additionally, or alternatively, the SASE engine may then utilize the received endpoint information to generate an endpoint specific security profile associated with the endpoint and specific to the endpoint/application/tenant tuple. The SASE engine may also be configured to store the security profile in a database including a mapping between the security profile and the endpoint.

The SASE engine may also configure a feedback loop between the SASE engine and an endpoint accessing the network. For example, the SASE engine may receive SASE capabilities, associated with an endpoint, from the endpoint. The SASE capabilities may be configured as an intent, such that the endpoint may express its intent for a specific application used by a specific tenant by sending the SASE capabilities to the SASE engine. Once received, the SASE engine may then assure that the intent expressed by the endpoint may be translated into actionable security capabilities and provide feedback to the endpoint specifying the security functions that the SASE engine may provide. In response to the feedback, the SASE engine may receive and acceptance or a declination to the proposed security functions. In some examples, when the endpoint declines the proposed security functions, the endpoint may send, with the declination, additional SASE capabilities to the SASE engine, and the SASE engine may reconsider the intent of the endpoint, application, and/or tenant. In some examples, when the endpoint accepts the proposed security functions, the SASE engine may generate a rule set and/or an additional security profile associated with the endpoint. For example, the SASE engine may generate the additional security profile based on the rule set and/or a previously stored security profile associated with the endpoint. Additionally, or alternatively, the rule set may be enforced, in addition to a security profile, during evaluation of a traffic flow associated with the endpoint.

In some examples, the feedback loop may be utilized by an endpoint, the SASE engine, and/or an enterprise network to maintain the highest level of security for an associated endpoint, application, and/or user. For example, an endpoint and/or enterprise network device may be configured to communicate application information, security vulnerability information, and/or other endpoint, application, and/or tenant specific information to the SASE engine.

In some examples, such application information may comprise an indication that an application has updated to a new version, and thus, the application may require additional and/or lesser security functions than that of which are offered by an associated security profile. For example, the SASE engine may store a first security profile associated with a first version of an application executing on an endpoint, and a second security profile associated with a second version of the application executing on the endpoint. When the first version of the application is executed on the endpoint, the first security profile may be employed by the SASE engine to evaluate the traffic flow associated with the endpoint. Additionally, or alternatively, when the second version of the application is executed on the endpoint, the second security profile may be employed by the SASE engine to evaluate the traffic flow associated with the endpoint. Additionally, or alternatively, a single security profile may comprise an indication of one or more security capabilities to enforce when the first version of the application is executed on the endpoint and one or more second security capabilities to enforce when the second version of the application is executed on the endpoint.

Additionally, or alternatively, the SASE engine may be configured to update and/or generate a new security profile for an endpoint following a security breach associated with an endpoint and/or a new commonly known security vulnerability (i.e., a vulnerability that has been documented). For example, rather than waiting for an application and/or endpoint update to mitigate a security vulnerability, the SASE engine may generate a security profile to add additional security capabilities that may help circumvent a vulnerability and/or reduce the impact of an ongoing attack.

Additionally, or alternatively, the SASE engine may generate security profiles having internet of things (IoT) awareness. For example, some endpoints may often access a network at different edge clouds, and as such, the endpoint may be sending a SASE profile to the SASE engine in each individual edge cloud it transitions to, such that seamless and consistent security capabilities are provided. As such, a SASE engine may be configured to include a set of security functions offered within the SASE framework that are required for the endpoint, such that the set of security functions meet all of the requirements of the individual edge clouds that are accessed by the endpoint.

Additionally, or alternatively, the SASE engine may support service level agreements (SLAs) defined by an enterprise. In some examples, an endpoint associated with an enterprise may connect to a network, such as, for example, a public network, and the tenant of such an endpoint may associated a premium to specific traffic and the handling of security functions within the public network. For example, a first endpoint, associated with a first user and having a first level SLA associated with the enterprise, may receive a first security capability associated with a traffic flow from the first endpoint, and a second endpoint, associated with a second user having a second level SLA associated with the enterprise, may receive a second security capability associated with a traffic flow from the second endpoint. In some examples, the first security capability may be more favorable (i.e., offer one or more additional and/or more efficient security capabilities) than the second security capability.

As previously mentioned, the SASE engine may evaluate the traffic flow associated with an endpoint based on various security profiles and/or rule sets associated with the endpoint. Additionally, or alternatively, the SASE engine may be configured to generate a formatted security profile by compiling a security profile associated with an endpoint into a format that is executable by an additional network device of the network (e.g., an additional network edge device, an additional network switch, a computing resource executing on an additional network device, or the like). The SASE engine may then send the formatted security profile to the additional network device where the traffic flow associated with the endpoint may be evaluated by the additional network device. The SASE engine may deliver security as a service to the endpoint by evaluating the traffic flow on the associated device and/or by evaluating the traffic flow on an additional associated network device.

As described herein, a computing-based solution can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to providing security as a service specific to a tenant, application, endpoint, and/or any combination thereof. For instance, the techniques described herein may receive endpoint information specific to an endpoint and/or a default security profile associated with an enterprise and generating one or more security profiles using the received data. By receiving endpoint information (i.e., application's that are being executed on the endpoint, characteristics of the endpoint, and/or tenant information associated with the endpoint) directly from an endpoint, the SASE engine may generate security profiles specific to the tenant, application, endpoint, and/or any combination thereof. Additionally, by implementing a feedback loop between the SASE engine and an endpoint, the SASE engine may continuously update a security profile, or otherwise generate additional security profiles to support application versioning, add additional security capabilities to handle commonly known vulnerabilities, support access by an endpoint to various edge clouds, and/or circumvent an ongoing attack directed at a specified endpoint.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture diagram 100 of an example flow for a computing resource network 102 to utilize a context-aware SASE engine executing on a network edge device associated with the network 102 to generate a security profile based on endpoint information received from and specific to an endpoint device accessing the network 102 and/or a default security profile received from an enterprise network 104 device, and using such security profiles to evaluate a traffic flow from associated endpoint devices. The computing resource network 102 may comprise one or more data centers 106 that include various networking components, such as, a Software-Defined-Networking (SDN) controller 108, spine network switches 110, and network switches 112 (also referred to as nodes) operating on physical servers. In some examples, one or more network switches 112 may be configured as a network edge node 114.

In some examples, physical server(s) 116 may host one or more virtual machines. Each virtual machine may be configured to execute one of various operations and act as one or more virtual components for the computing resource network 102, such as, for example, computing-based resources 118. In some examples, the physical server(s) 116 may host any number of virtual machines. In some examples, physical server(s) 116 in the computing resource network 102 may host the various network components of the computing resource network 102, such as, for example, the spine network switch(es) 110, the network node(s) 112, and/or the network edge nodes 114. Additionally, or alternatively, the one or more virtual machine(s) operating on a physical server 116 associated with a network edge node 114 may execute a SASE engine 120 and/or a security profiles database 122 which may comprise an endpoint profile mapping table 124.

The computing resource network 102 may provide on-demand availability of computing system resources of physical server(s), such as data storage, computing power (e.g., CPU, GPU, etc.), networking, databases, etc., without direct active management by users. In some examples, the computing resource network 102 may be managed and maintained by a service provider such that users do not have to invest in and maintain the computing infrastructure for their computing resource needs. Generally, a user may be provided access to, or allocated use of, a portion of the computing resources of physical server(s) in the computing resource network 102. The computing resource network 102 may scale, such as by spinning up resources or spinning down resources, based on demand for the individual users. The portions of the computing resource network 102 may be allocated using hardware virtualization such that portions of the computing resource network 102 can be configured and managed by the user (e.g., security configuration, load balancing configuration, etc.). However, the computing resource network 102 need not be managed by a service provider, and can be managed by any entity, including the user themselves that run the applications or services.

The computing resource network 102 may comprise computer-readable-media. As previously mentioned, the computer-readable media may include one or more SASE engine(s) 120 disposed in various locations about the computing resource network 102. In some examples, the SASE engine 120 may be disposed on at least one of a network device associated with the computing resource network 102, such as, for example, a network controller 108, a network spine switch 110, a network node 112, and/or a network edge node 114, and/or an endpoint 126 associated with the computing resource network 102.

The computing resource network 102 may be accessible to a user 128 to interact directly with the computing resources 118. The user(s) 128 may comprise one or more of individual users, groups of users, organizations, businesses, or other entities that interact with the computing resource network 102 via respective user devices 126. The user devices 126 may be any type of computing device capable of connecting to the computing resource network 102 via the data communications network 130 such as, but not limited to, a laptop or desktop computer, a tablet computing device, a server computer, a television, or a mobile telephone.

The users 128 may provide user input 132 and/or endpoint information via the network(s) 130 to interact with the computing resource network 102. For example, the users 128 may utilize one or more user interface(s), provided by the computing resource network 102, via the one or more user device(s) 126. In some examples, the endpoint(s) and/or user device(s) 126 may report endpoint information and/or SASE security profiles to the SASE engine 120. Additionally, or alternatively, the users 128 may interact with an associated endpoint device 126 to manage or otherwise interact with computing-based services, or resources 118, provided by the computing resource network 102.

Take, for example, an enterprise having an enterprise network 104 in communication with a computing resource network 102 as described herein. Such an enterprise may have various users 128 accessing the computing resource network 102 via one or more endpoints 126, such as, for example, user devices 126. In such an example, when a new endpoint connects to the computing resource network 102, via an edge node 114 of the computing resource network 102, the SASE engine 120 associated with the edge node 114 may be configured to generate a security profile associated with the endpoint 126. The SASE engine 120 may generate a security profile based at least partly on data received from the enterprise network 104, a default security profile associated with the computing resource network 102, contextual endpoint information, and/or any combination thereof. Additionally, or alternatively, the SASE engine 120 may be configured to store an endpoint profile mapping 124 between one or more security profiles and the endpoint 126. In some examples, the SASE engine 120 may be configured to evaluate a traffic flow associated with the endpoint 126 based at least partly on the security profile associated with the endpoint 126. Additionally, or alternatively, the SASE engine 120 may be configured to evaluate the traffic flow associated with the endpoint 126 based on various security profiles associated with the endpoint 126, such that the SASE engine 120 may be configured to autonomously select between security profiles associated with the endpoint 126, based on contextual data associated with the endpoint 126, an application executing on the endpoint 126, a tenant associated with the endpoint 126, and/or any combination thereof.

At "1," a network device associated with a computing resource network 102 may execute a context-aware SASE engine 120. In some examples, the SASE engine 120 may be deployed at various locations in the computing resource network 102, such as, for example, network components (i.e., a network controller 108, spine switch(es) 110, leaf switch(es) 112, node(s) 112, etc.), endpoints 126 associated with the network 102, and/or any other device(s) and/or node(s) associated with the network 102. Additionally, or alternatively, the SASE engine 120 may be configured as a software agent executing on any one of the network components associated with the computing resource network 102. For example, the SASE engine 120 may be deployed at an edge node 114 of the computing resource network 102. In some examples, the edge node 114 may be configured to communicate with one or more enterprise network(s) 104 via one or more network(s) 130. Additionally, or alternatively, an edge node 114 may be configured to execute and/or maintain the SASE engine 120 and/or a security profiles data store 122. In some examples, the security profiles data store 122 may comprise an endpoint table mapping 124, where endpoints associated with the edge node 114 may be mapped to corresponding security profiles (i.e., enterprise default security profiles and/or custom endpoint security profiles).

In some examples, at "2A," the SASE engine 120 may receive data, representing a default security profile and/or a basic set of information relevant to the specific edge cloud and/or branch of an enterprise, from an associated enterprise network 104. For example, the enterprise network 104 may be configured to exchange data with the SASE engine 120 and describe standard security functions that each endpoint 126, application, and/or tenant should receive, describe traffic patterns associated with the endpoint 126, and/or inform the SASE engine 120 about the negotiation level.

Additionally, or alternatively, at "2B," the SASE engine 120 may generate a security profile associated with an endpoint 126(1) based on endpoint information received from the endpoint 126(1). For example, the SASE engine 120 may receive data 132(1) representing endpoint information from the endpoint 126(1). In some examples, the endpoint information may comprise a security profile that is specific to the endpoint 126(1), an application that is executing on the endpoint 126(1), and/or the tenant and/or user associated with the endpoint 126(1).

At "3," the SASE engine 120 may then utilize the default security profile and/or the additional data received from the enterprise network 104 to generate a security profile for an endpoint 126(2) associated with the enterprise and accessing the network 102. The SASE engine may also be configured to store the security profile in a security profiles database 122 including a endpoint profile mapping 124 between the security profile and the endpoint 126(2). Additionally, or alternatively, the SASE engine 120 may then utilize the received endpoint information to generate an endpoint specific security profile associated with the endpoint 126(1) and specific to the endpoint/application/tenant tuple. The SASE engine 120 may also be configured to store the security profile in a security profiles database 122 including an endpoint profile mapping 124 between the security profile and the endpoint 126(1).

Additionally, at "3," the SASE engine 120 may evaluate the traffic flow associated with an endpoint 126 based on various security profiles and/or rule sets associated with the endpoint 126. For example, the SASE engine 120 may evaluate the traffic flow associated with endpoint 1 126(1) based on the endpoint specific security profile generated from the data 132(1) indicating the endpoint information received from and associated with the endpoint 126(1). Additionally, or alternatively, the SASE engine 120 may evaluate the traffic flow associated with endpoint N 126(2) based on the security profile associated with the endpoint 126(2) and based on the default security profile received from the enterprise network 104. Additionally, or alternatively, the SASE engine 120 may be configured to generate a formatted security profile by compiling a security profile associated with an endpoint 126 into a format that is executable by an additional network device of the network 102 (e.g., an additional network edge device 114, an additional network switch 110, 112, a computing resource 118 executing on an additional network device 116, or the like). The SASE engine 120 may then send the formatted security profile to the additional network device where the traffic flow associated with the endpoint 126 may be evaluated by the additional network device. The SASE engine 120 may deliver security as a service to the endpoint 126 by evaluating the traffic flow on the network device executing the SASE engine 120 and/or by evaluating the traffic flow on an additional associated network device executing a SASE engine 120.

Figure 2:
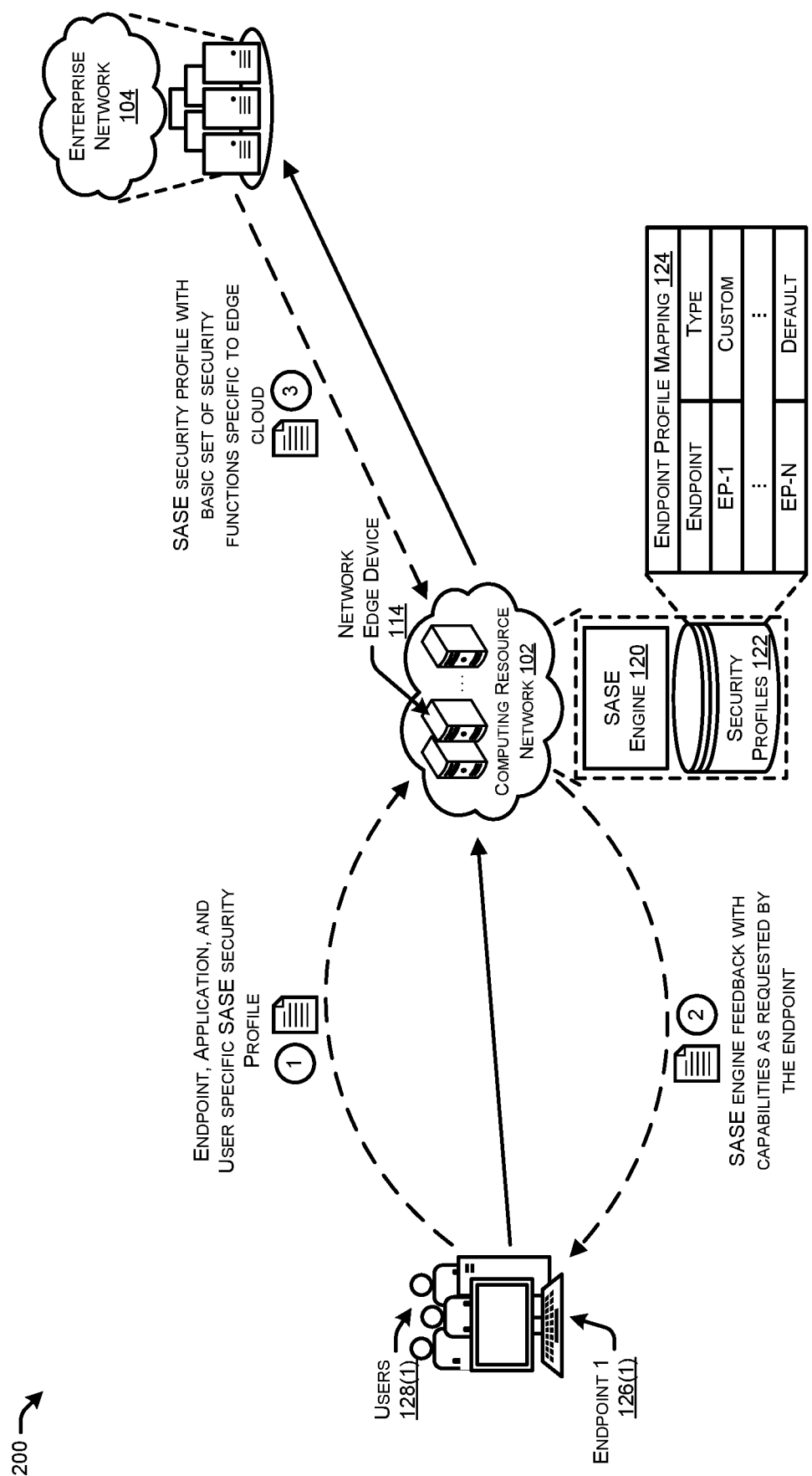
FIG. 2 illustrates system-architecture diagram of an example flow for utilizing a context-aware SASE engine executing on a network edge device associated with a network to generate a security profile based on endpoint information received from and specific to an endpoint device accessing the network and/or a basic set of security functions received from an enterprise network.

FIG. 2 illustrates system-architecture diagram of an example flow 200 for utilizing a context-aware SASE engine 120 executing on a network edge device 114 associated with a computing resource network 102 to generate a security profile based on endpoint information received from and specific to an endpoint device 126(1) accessing the network and/or a basic set of security functions received from an enterprise network 104.

In some examples, an enterprise may have an enterprise network 104 in communication with a computing resource network 102 as described herein. Such an enterprise may have various users 128 accessing the computing resource network 102 via one or more endpoints 126, such as, for example, user devices. In such an example, when a new endpoint 126(1) connects to the computing resource network 102, via a network edge device 114 of the computing resource network 102, the SASE engine 120 associated with the edge node 114 may be configured to generate a security profile associated with the endpoint 126(1) in a number of ways. In some examples, SASE engine 120 may generate a security profile based at least partly on data received from the enterprise network 104, a default security profile associated with the computing resource network 102, contextual endpoint information, and/or any combination thereof. Additionally, or alternatively, the SASE engine 120 may manage a security profiles database 122 configured to store an endpoint profile mapping 124 between one or more security profiles and the endpoint 126(1).

At "1," an endpoint 126(1) accessing the computing resource network 102 may send endpoint information including endpoint, application, and/or user specific SASE security profile data to a network edge device 114 associated the computing resource network 102 that is executing a SASE engine 120. The SASE engine 120 may generate a security profile associated with the endpoint 126(1) based on endpoint information received from the endpoint 126(1). As previously mentioned, the endpoint information may comprise a security profile that is specific to the endpoint 126(1), an application that is executing on the endpoint 126(1), and/or the tenant and/or user 128(1) associated with the endpoint 126(1). Additionally, or alternatively, the SASE engine 120 may then utilize the received endpoint information to generate an endpoint specific security profile associated with the endpoint 126(1) and specific to the endpoint/application/tenant tuple. The SASE engine 120 may also be configured to store the security profile in a security profiles database 122 including an endpoint profile mapping 124 between various endpoint(s) 126 and associated security profiles.

Additionally, or alternatively, the SASE engine 120 may be configured to evaluate a traffic flow associated with the endpoint 126(1) based at least partly on the security profile associated with the endpoint 126(1). Additionally, or alternatively, the SASE engine 120 may be configured to evaluate the traffic flow associated with the endpoint 126(1) based on various security profiles associated with the endpoint 126(1), such that the SASE engine 120 may be configured to autonomously select between security profiles associated with the endpoint 126(1), based on contextual data associated with the endpoint 126(1), an application executing on the endpoint 126(1), a tenant associated with the endpoint 126(1), and/or any combination thereof. Such security profiles may be generated for an endpoint 126(1) based on data received from the endpoint 126(1) and/or the enterprise network 104. For example, a feedback loop may be implemented between an endpoint 126(1) accessing the computing resource network 102 and the network edge device 114 and/or between an enterprise network device associated with the enterprise network 104 and the network edge device 114.

In some examples, the feedback loop may be utilized by an endpoint 126(1), the SASE engine 120, and/or an enterprise network 104 to maintain the highest level of security for an associated endpoint 126(1), application, and/or user 128(1). For example, an endpoint 126(1) and/or enterprise network device associated with the enterprise network 104 may be configured to communicate application information, security vulnerability information, and/or other endpoint, application, and/or tenant specific information to the SASE engine 120. Various SASE security profile examples are presented with respect to FIGS. 4A-7B.

At "2," the SASE engine 120 may receive SASE capabilities, associated with an endpoint, from the endpoint 126(1). The SASE capabilities may be configured as an intent, such that the endpoint 126(1) may express its intent for a specific application used by a specific tenant by sending the SASE capabilities to the SASE engine 120. Once received, the SASE engine 120 may then assure that the intent expressed by the endpoint 126(1) may be translated into actionable security capabilities and provide feedback to the endpoint 126(1) specifying the security functions that the SASE engine 120 may provide. In response to the feedback, the SASE engine 120 may receive and acceptance or a declination to the proposed security functions. In some examples, when the endpoint 126(1) declines the proposed security functions, the endpoint 126(1) may send, with the declination, additional SASE capabilities to the SASE engine 120, and the SASE engine 120 may reconsider the intent of the endpoint 126(1), application, and/or tenant. Additionally, or alternatively, when the endpoint 126(1) accepts the proposed security functions, the SASE engine 120 may generate a rule set and/or an additional security profile associated with the endpoint 126(1). For example, the SASE engine 120 may generate the additional security profile based on the rule set and/or a previously stored security profile associated with the endpoint 126(1). Additionally, or alternatively, the rule set may be enforced, in addition to a security profile, during evaluation of a traffic flow associated with the endpoint 126(1).

At "3," the SASE engine 120 may generate a security profile associated with an endpoint 126(1) based on a default security profile received from an enterprise network 104 associated with the endpoint 126(1). For example, upon determination of a new endpoint 126(1) connecting to the computing resource network 102, the SASE engine 120 may receive a default security profile from an enterprise device of an enterprise network 104 associated with the endpoint 126(1). In some examples, the default security profile may comprise a basic set of information relevant to the specific edge cloud and/or branch of the enterprise. For example, the enterprise network 104 may be configured to exchange data with the SASE engine 120 and describe standard security functions that each endpoint 126, application, and/or tenant should receive, describe traffic patterns associated with the endpoint 126, and/or inform the SASE engine 120 about the negotiation level. The SASE engine 120 may then utilize the default security profile and/or the additional data received from the enterprise network 104 to generate a security profile for the endpoint 126(1). The SASE engine 120 may also be configured to store the security profile in a security profiles database 122 including an endpoint profile mapping 124 between the endpoint 126(1) and one or more associated endpoint security profile(s).

Additionally, or alternatively, the enterprise network 104 may send data to the network edge device 114, indicating, for example, enterprise-specific endpoint information that applies to all of the endpoint(s) 126 that are associated with the enterprise network 104 and accessing the computing resource network 102. The SASE engine 120 may utilize the enterprise-specific endpoint information to update, or otherwise generate additional security profiles, for associated endpoints 126, and evaluate traffic flows for such endpoints 126 according to the enterprise-specific endpoint information received from the enterprise network 104.

Figure 3:
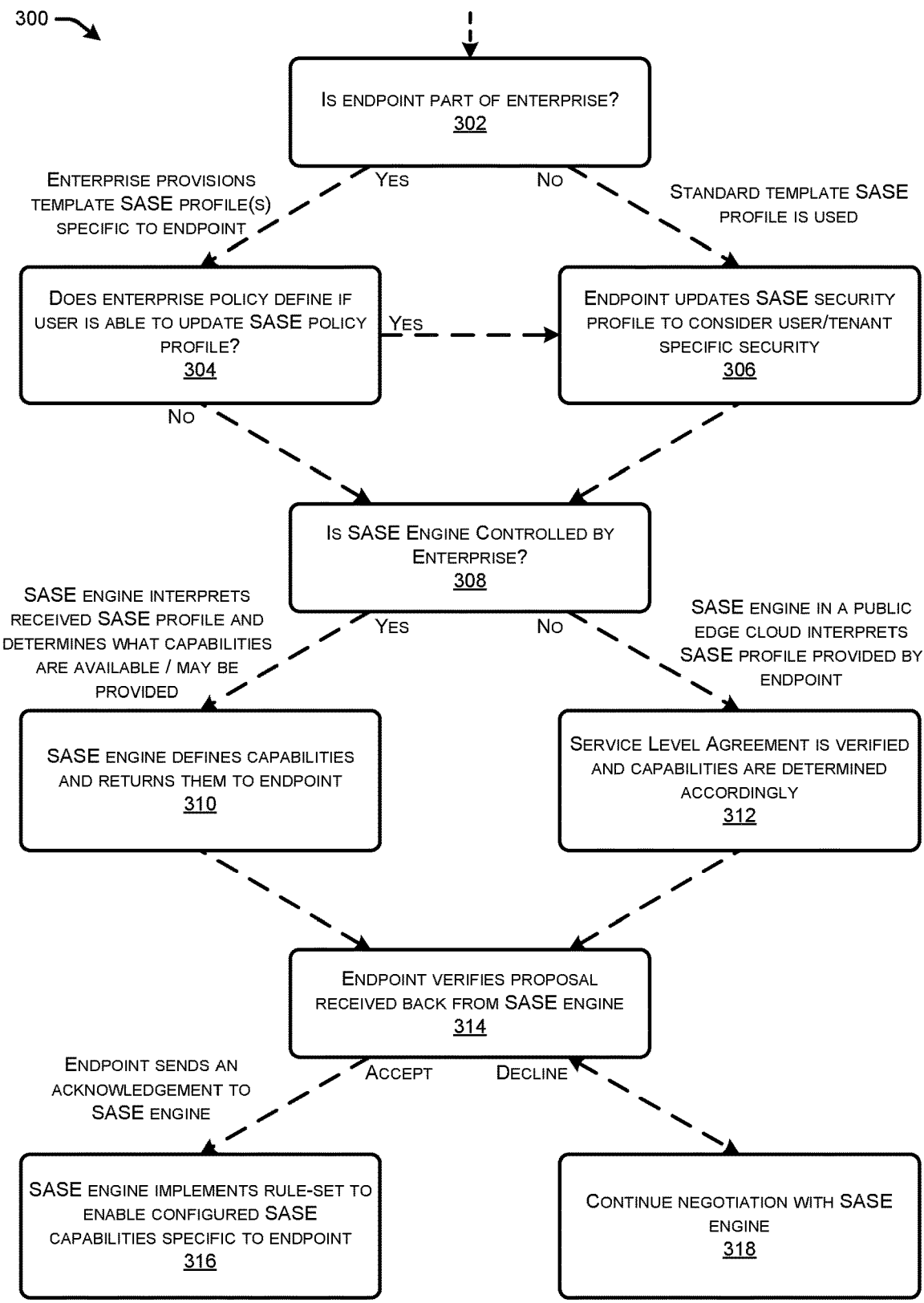
FIG. 3 illustrates an example flow diagram of a feedback loop for determining a rule-set to enable SASE capabilities configured specific to an endpoint.

FIG. 3 illustrates an example flow diagram 300 of a feedback loop implemented in a computing resource network 102 for determining a rule-set to enable SASE capabilities configured specific to an endpoint 126 and/or an enterprise network 104.

At 302, the computing resource network 102 may determine if the endpoint is associated with an enterprise. In some examples, if the endpoint is associated with an enterprise, the flow may continue to 304. Additionally, or alternatively, if the endpoint is not associated with an enterprise, the flow may continue to 306. In some examples, when an endpoint 126 accesses the computing resource network 102, data may be exchanged to determine if the endpoint 126 is associated with an enterprise. In some examples, if the endpoint 126 is associated with an enterprise, the computing resource network 102 may utilize enterprise template SASE profiles, that may be specific to the endpoint 126, to evaluate a traffic flow associated with the endpoint 126. In some examples, the enterprise template SASE profiles may be received from a device included in an enterprise network 104 associated with the enterprise. Additionally, or alternatively, if the endpoint 126 is not associated with an enterprise, the computing resource network 102 may utilize standard SASE template profiles to evaluate the traffic flow associated with the endpoint 126.

At 304, the computing resource network 102 may determine if a policy associated with the enterprise defines whether or not a user 128 associated with the endpoint 126 is able to update the SASE security profile. In some examples, if the policy indicates that the user 128 is able to update the SASE security profile associated with the endpoint 126, the flow may continue to 306. Additionally, or alternatively, if the policy indicates that the user is unable to update the SASE security profile associated with the endpoint 126, the flow may continue to 308.

At 306, the endpoint 126 may update the SASE security profile to consider user and/or tenant specific security capabilities. For example, the endpoint 126 send endpoint information include endpoint, application, and/or user specific SASE security profile data to the SASE engine 120. As previously mentioned, the endpoint information may comprise a security profile that is specific to the endpoint 126, an application that is executing on the endpoint 126, and/or the tenant and/or user 128 associated with the endpoint 126.

At 308, the computing resource network 102 may determine if the SASE engine 120 is controlled by the enterprise. In some examples, if the SASE engine 120 is controlled by the enterprise, the flow may continue to 310, and the SASE engine 120 associated with the enterprise may interpret the received SASE profile and determine what capabilities are available to the endpoint 126 and/or may be provided to the endpoint 126. Additionally, or alternatively, if the SASE engine is not controlled by the enterprise, the flow may continue to 312, and the SASE engine 120 in a public cloud may interpret the SASE profile provided by the endpoint 126.

At 310, the SASE engine 120 may define security capabilities and return such security capabilities to the endpoint 126 for acceptance. In some examples, the SASE engine 120 may generate a security profile associated with the endpoint 126 based on the endpoint information received from the endpoint 126. For example, the SASE engine 120 may utilize the received endpoint information to generate an endpoint specific security profile associated with the endpoint 126 and specific to the endpoint/application/tenant tuple At 312, a service level agreement (SLA) associated with the endpoint 126 is verified, and security capabilities are determined accordingly. For example, the SLA associated with the endpoint may indicate a first level SLA and/or a second level SLA (although any number of levels may be contemplated and the first and second levels are discussed herein as an example). In some examples, the first level SLA may be associated with a first set of security capabilities, and the second level SLA may be associated with a second set of security capabilities. In some examples, the first set of security capabilities may be more favorable (i.e., offer more security capabilities and/or more efficient variations of security capabilities) than the second set of security capabilities. Additionally, or alternatively, the first level SLA and/or the second level SLA may be associated with a premium, such that, for example, the first level SLA may be a paid (or premium) level SLA and the second level SLA may be a free (or trial) level SLA. Once the SLA associated with the endpoint 126 is determined, the proposed security capabilities may be sent from the SASE engine 120 to the endpoint 126.

At 314, the endpoint 126 may verify the proposed security capabilities received from the SASE engine 120 and may send data to the SASE engine 120 indicating whether the endpoint 126 accepts or declines the proposed security capabilities. In some examples, if the endpoint 126 accepts the proposed security capabilities, the flow may continue to 316, and the endpoint 126 may send an acknowledgement to the SASE engine 120. Additionally, or alternatively, if the endpoint 126 declines the proposed security capabilities received from the SASE engine 120, the flow may continue to 318, and the endpoint 126 may continue to exchange data with the SASE engine 120 to further negotiate security capabilities.

At 316, when the endpoint 126 accepts the proposed security functions, the SASE engine 120 may generate a rule set and/or an additional security profile associated with the endpoint 126. For example, the SASE engine 120 may generate the additional security profile based on the rule set and/or a previously stored security profile associated with the endpoint 126. Additionally, or alternatively, the rule set may be enforced, in addition to a security profile, during evaluation of a traffic flow associated with the endpoint 126.

At 318, as previously mentioned, the endpoint may continue to exchange data with the SASE engine 120 to further negotiate security capabilities. In some examples, the SASE engine 120 may add and/or remove one or more of the proposed security capabilities to the SASE security profile and may return the altered SASE security profile to the endpoint 126. For example, the endpoint 126 may send along with the declination, data indicating one or more of the proposed security capabilities that may be objected to and/or one or more security capabilities that are desired and omitted from the pending proposed security capabilities. This process may continue until the SASE engine 120 receives an acceptance with respect to the proposed security capabilities from the endpoint 126.

FIGS. 4A and 4B collectively illustrate an example endpoint specific SASE security profile 400 configuration generated by a SASE engine 120 using endpoint information received from the endpoint and an example default SASE security profile 410 configuration generated by a SASE engine 120 using a default security profile received from an enterprise network 104.

In some examples, the endpoint specific SASE security profile 400 may provide an endpoint 126, application, and/or user 128 the ability to express intent to the SASE engine 120, and may indicate security capabilities associated with a security profile specific to an endpoint 126, application executing on the endpoint 126, and/or a user 128 associated with the endpoint 126.

Additionally, or alternatively, the default SASE security profile 410 may indicate a basic set of security capabilities and/or specified traffic routing associated with a default security profile 410 required by an enterprise and/or an edge cloud associated with an endpoint 126.

Figures 5A, 5B:
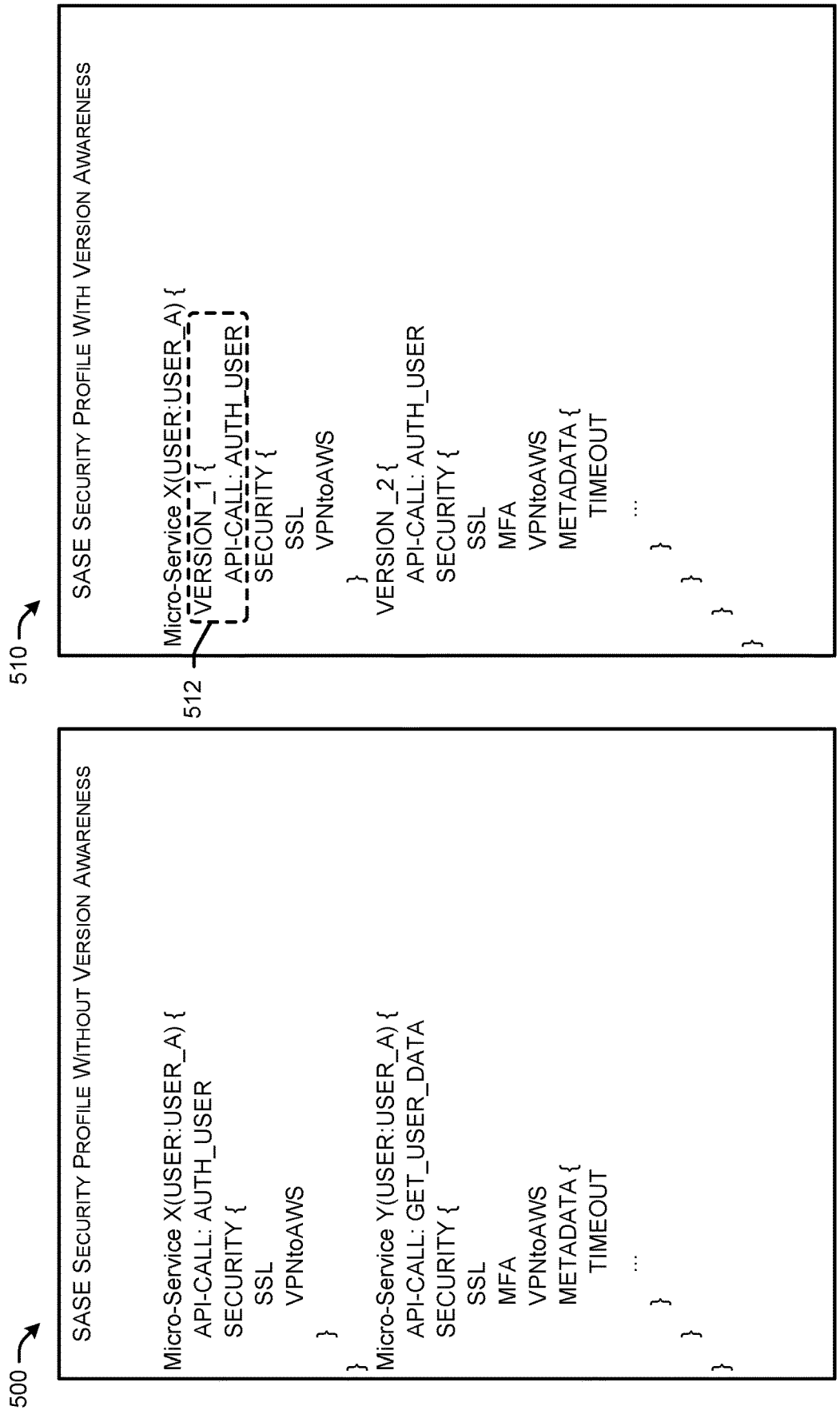
FIGS. 5A and 5B collectively illustrate an example SASE security profile configuration without version awareness and an example SASE security profile configuration with version awareness.

FIGS. 5A and 5B collectively illustrate an example SASE security profile configuration without version awareness 500 and an example SASE security profile configuration with version awareness 510.

In some examples, a feedback loop may be utilized by an endpoint 126, the SASE engine 120, and/or an enterprise network 104 to maintain the highest level of security for an associated endpoint 126, application, and/or user 128. For example, an endpoint 126 and/or enterprise network device 104 may be configured to communicate application information, security vulnerability information, and/or other endpoint 126, application, and/or tenant specific information to the SASE engine 120.

In some examples, such application information may comprise an indication that an application has updated to a new version, and thus, the application may require additional and/or lesser security functions than that of which are offered by an associated security profile. For example, a security profile with version awareness 510 may include one or more indications of a version 512 of an endpoint and/or application and may implement associated security capabilities accordingly. For example, a single security profile with version awareness 510 may comprise an indication of one or more security capabilities to enforce when the first version of the application is executed on the endpoint 126 and one or more second security capabilities to enforce when the second version of the application is executed on the endpoint 126. Additionally, or alternatively, one or more security profiles without version awareness 500 may be implemented to enforce various security capabilities corresponding to various application versions.

FIGS. 6A-6C illustrate an example default SASE security profile configuration 600, an example SASE security profile configuration with dynamic adjustment for common vulnerabilities 610, and an example SASE security profile configuration with dynamic adjustment for endpoints impacted by an attack 620.

In some examples, the default SASE security profile 600 may indicate a basic set of security capabilities and/or specified traffic routing associated with a default security profile 600 required by an enterprise and/or an edge cloud associated with an endpoint 126.

Additionally, or alternatively, a SASE security profile configuration with dynamic adjustment for common vulnerabilities 610 may comprise one or more of the default SASE security profile 600 capabilities. Additionally, or alternatively, the SASE security profile configuration with dynamic adjust for common vulnerabilities 610 may comprise one or more indications of a common vulnerability 612. Each of the indications of a common vulnerability 612 may include one or more security capabilities that may help circumvent the common vulnerability 612 indicated by the SASE security profile configuration with dynamic adjustment for common vulnerabilities 610. The SASE security profile configuration with dynamic adjustment for common vulnerabilities 610 may be generated using data transmitted through the feedback loop discussed herein.

Additionally, or alternatively, a SASE security profile configuration with dynamic adjustment for endpoints impacted by an attack 620 may comprise one of more of the default SASE security profile 600 capabilities. Additionally, or alternatively, the SASE security profile configuration with dynamic adjustment for endpoints impacted by an attack 620 may comprise one or more indications of an endpoint specific attack 622. Each of the indications of the endpoint specific attack 622 may reduce the impact of an ongoing endpoint specific attack 622 indicated by the SASE security profile configuration with dynamic adjustment for endpoints impacted by an attack 620. The SASE security profile configuration with dynamic adjustment for endpoints impacted by an attack 620 may be generated using data transmitted through the feedback loop discussed herein.

Figures 7A, 7B:
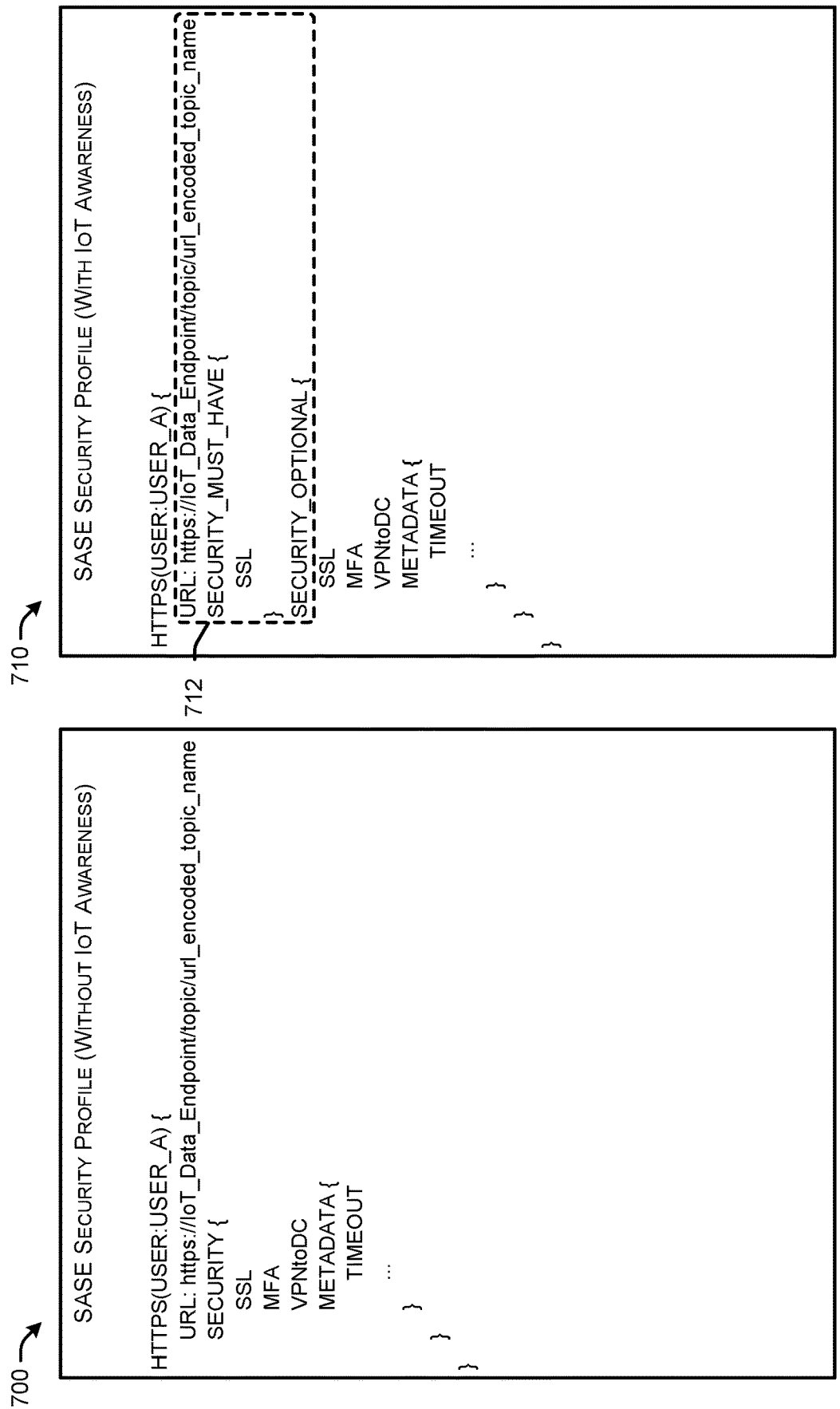
FIGS. 7A and 7B collectively illustrate an example SASE security profile configuration without internet of things awareness and an example SASE security profile configuration with internet of things awareness.

FIGS. 7A and 7B collectively illustrate an example SASE security profile configuration without internet of things awareness 700 and an example SASE security profile configuration with internet of things awareness 710.

In some examples, a SASE security profile configuration without internet of things awareness 700 may comprise a set of security capabilities to be enforced with respect to an endpoint 126, application, and/or a user 128. In some examples, the SASE security profile configuration without internet of things awareness 700 may comprise one or more of the security capabilities included the SASE security profiles described with respect to FIGS. 1-6C. Additionally, or alternatively, the SASE security profile configuration without internet of things awareness 700 may implement the same security capabilities regardless of the edge cloud that is accessed by an endpoint 126.

Additionally, or alternatively, a SASE security profile configuration with internet of things awareness 710 may comprise a set of security capabilities to be enforced with respect to an endpoint 126, application, a user 128, and/or an edge cloud that is accessed by the endpoint 126. In some examples, the SASE security profile configuration with internet of things awareness 710 may comprise one or more of the security capabilities included the SASE security profiles described with respect to FIGS. 1-6C. Additionally, or alternatively, the SASE security profile configuration with internet of things awareness 710 may comprise an indication of required and/or optional security capabilities 712. In some examples, the SASE security profile configuration with internet of things awareness 710 may implement required security capabilities regardless of the edge cloud that is accessed by the endpoint 126 and/or optional security capabilities depending on the edge cloud that is accessed by the endpoint 126. This ensures that during migrations and/or negotiations between edge clouds, must-have securities are always implemented, and edge cloud specific securities are implemented when appropriate.

Figure 8:
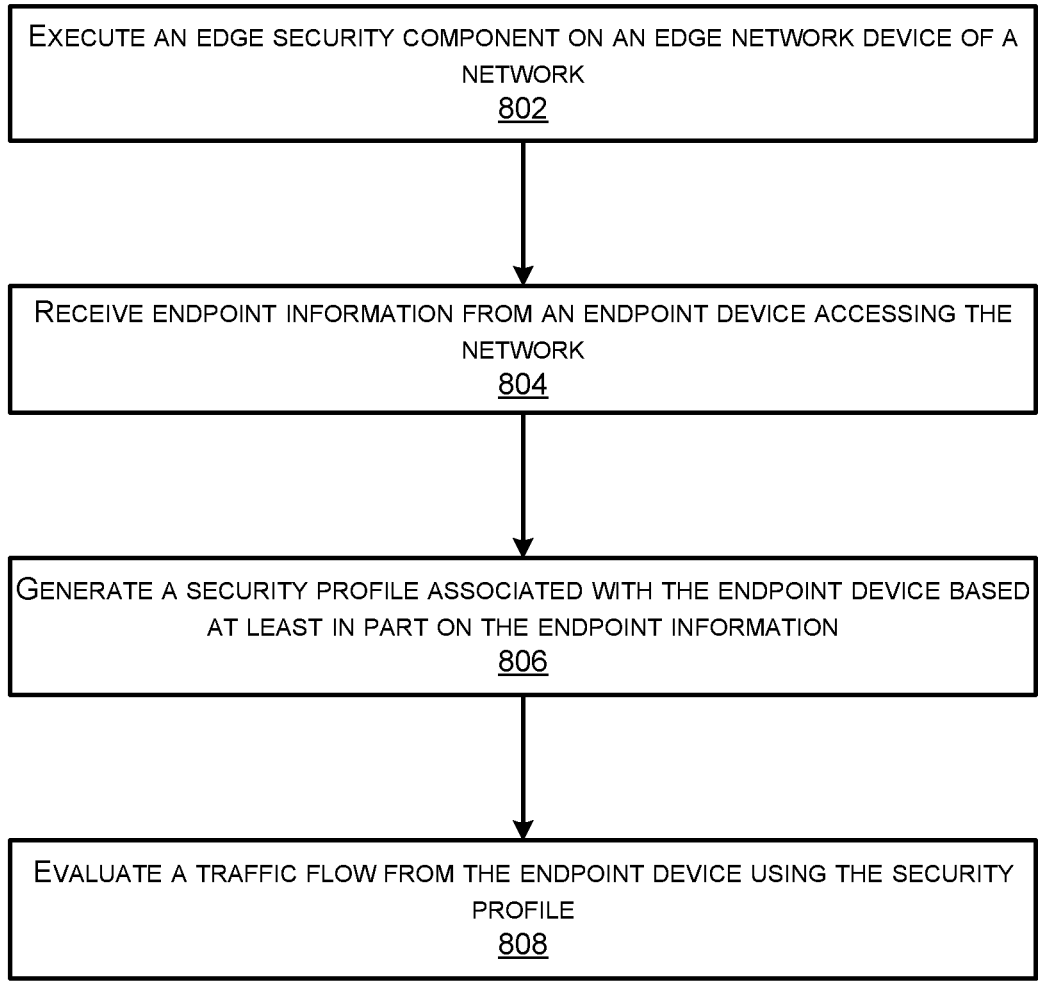
FIG. 8 illustrates a flow diagram of an example method for a context-aware SASE engine executing on a network edge device associated with a network to generate a security profile based on endpoint information received from and specific to an endpoint device accessing the network and using the security profile to evaluate a traffic flow from the endpoint device.
Figure 9:
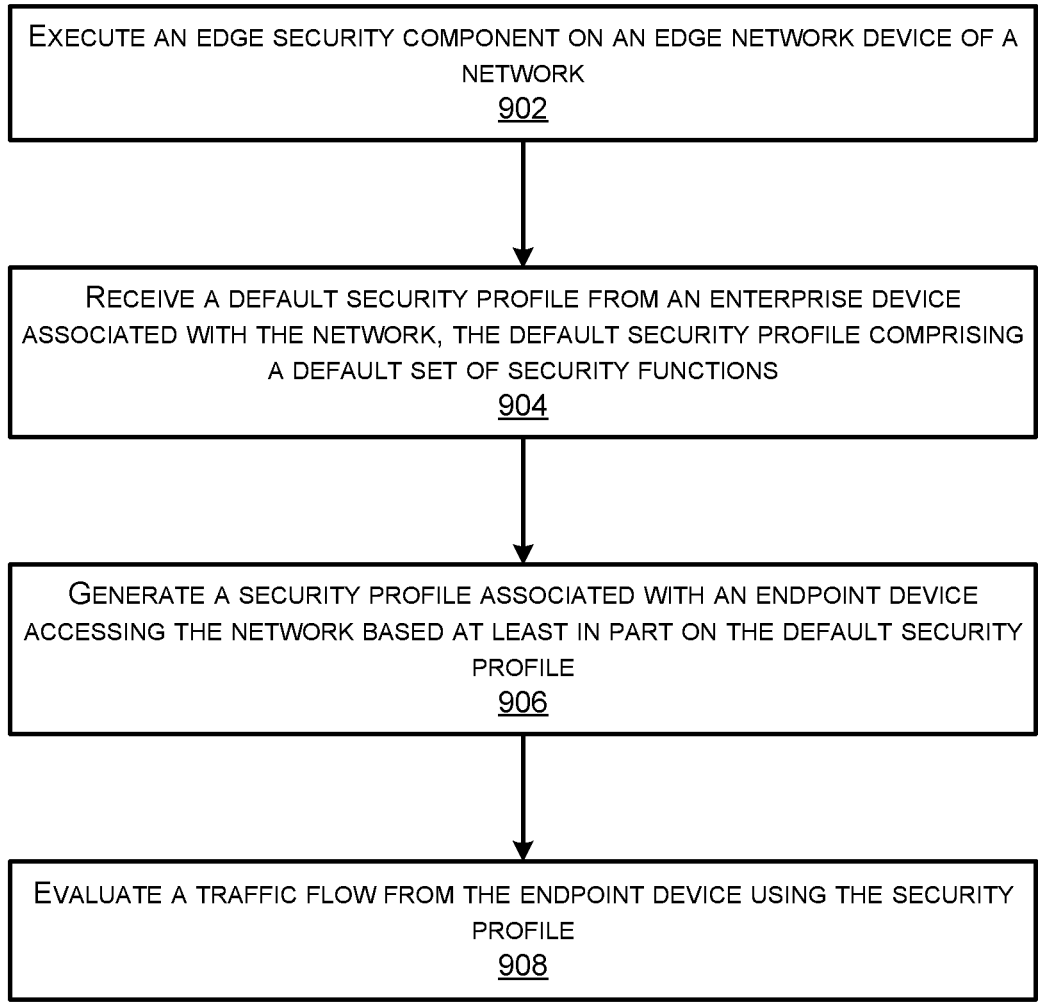
FIG. 9 illustrates a flow diagram of an example method for a context-aware SASE engine executing on a network edge device associated with a network to generate a security profile based on a default security profile received from a device associated with an enterprise network and using the security profile to evaluate a traffic flow from an endpoint device accessing the network.
Figure 10:
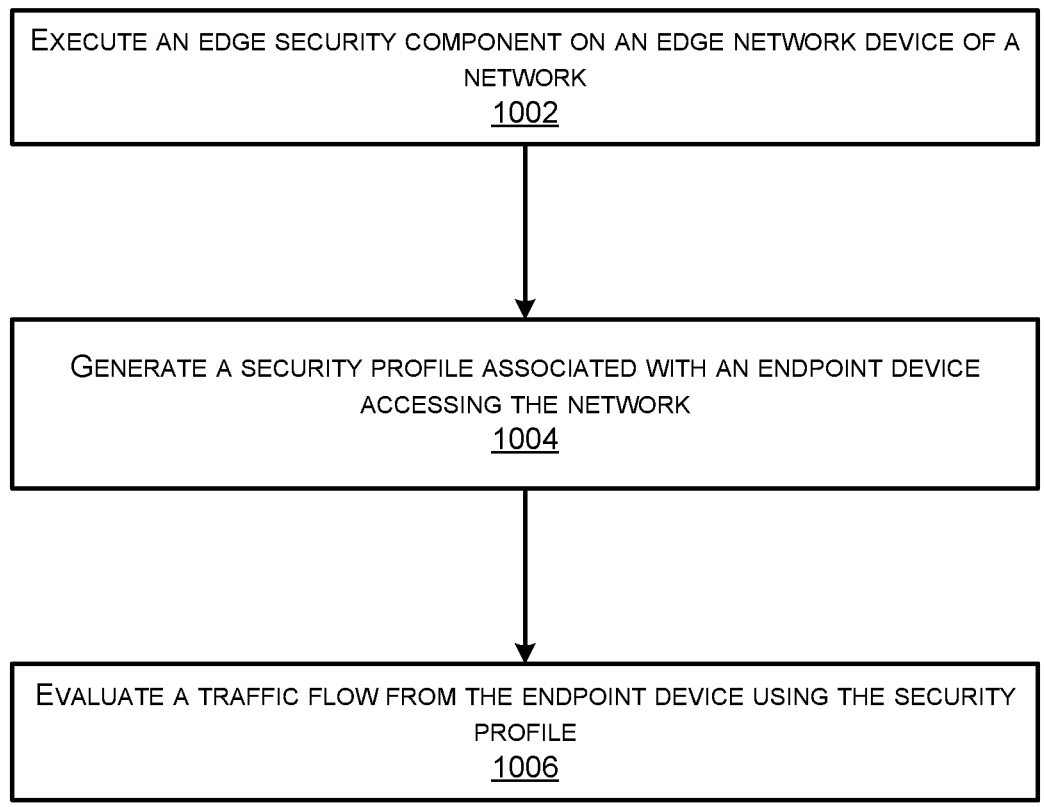
FIG. 10 illustrates a flow diagram of an example method for a context-aware SASE engine executing on a network edge device associated with a network to generate a security profile specific to an endpoint device accessing the network and using the security profile to evaluate a traffic flow from the endpoint device.

FIGS. 8, 9, and 10 illustrate flow diagrams of example methods 800, 900, and 1000 and that illustrate aspects of the functions performed at least partly by the computing resource network 102 as described in FIGS. 1 and 2. The logical operations described herein with respect to FIGS. 8, 9, and 10 may be implemented (1) as a sequence of computer-implemented acts or program modules running on a computing system and/or (2) as interconnected machine logic circuits or circuit modules within the computing system. In some examples, the method(s) 800, 900, and 1000 may be performed by a system comprising one or more processors and one or more non-transitory computer-readable media storing computer-executable instructions that, when executed by the one or more processors, cause the one or more processors to perform the method(s) 800, 900, and 1000.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 8, 9, and 10 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 8 illustrates a flow diagram of an example method 800 for a context-aware SASE engine 120 executing on a network edge device 114 associated with a computing resource network 102 to generate a security profile based on endpoint information received from and specific to an endpoint device 126 accessing the network 102 and using the security profile to evaluate a traffic flow from the endpoint device 126.

At 802, the method 800 may include executing an edge security component on an edge network device of a network. In some examples, the edge security component may be configured as the SASE engine 120 as described with respect to FIGS. 1-7B. Additionally, or alternatively, the edge network device may be configured as the network edge node 114 as described with respect to FIGS. 1-7B. Additionally, or alternatively, the network may be configured as the computing resource network 102 and/or the enterprise network 104 as described with respect to FIGS. 1-7B.

At 804, the method 800 may include receiving endpoint information from an endpoint device accessing the network. In some examples, the endpoint device may be configured as the endpoint(s) 126 as described with respect to FIGS. 1-7B. Additionally, or alternatively, the endpoint information may comprise the data 132 as described with respect to FIGS. 1-7B.

At 806, the method 800 may include generating a security profile associated with the endpoint device based at least in part on the endpoint information. In some examples, generating the security profile may comprise any of the security profile generation techniques described herein with respect to FIGS. 1-7B. Additionally, or alternatively, the security profile may be configured as, but not limited to, the example security profiles as described with respect to FIGS. 4A-7B.

At 808, the method 800 may include evaluating a traffic flow from the endpoint device using the security profile. In some examples, evaluating the traffic flow from the endpoint device may comprise any of the evaluating techniques described herein with respect to FIGS. 1-7B.

Additionally, or alternatively, the method 800 may include receiving an intent from the endpoint device accessing the network. In some examples, the intent may indicate security details associated with at least one of the endpoint device, an application associated with the endpoint device, and/or a tenant associated with the endpoint device. Additionally, or alternatively, the method 800 may include identifying security capabilities associated with the intent. Additionally, or alternatively, sending the security capabilities to the endpoint device.

Additionally, or alternatively, the method 800 may include receiving an acceptance of the security capabilities from the endpoint device. Additionally, or alternatively, the method 800 may include generating a rule set associated with the endpoint device. In some examples, the rule set may be configured to enable the security capabilities for the endpoint device. Additionally, or alternatively, the method 800 may include evaluating the traffic flow from the endpoint device using the rule set.

Additionally, or alternatively, the method 800 may include generating a formatted security profile by compiling the security profile into a format that is executable by an additional edge network device of the network. Additionally, or alternatively, the method 800 may include sending the formatted security profile to the additional edge network device. Additionally, or alternatively, the method 800 may include evaluating, by the additional edge network device, the traffic flow from the endpoint device using the security profile.

In some examples, evaluating the traffic flow from the endpoint device using the security profile may comprise evaluating the traffic flow by at least one of the edge security component or the edge network device.

Additionally, or alternatively, the method 800 may include allowing the traffic flow from the endpoint device based at least in part on the evaluating. Additionally, or alternatively, the method 800 may include denying the traffic flow from the endpoint device based at least in part on the evaluating.

In some examples, the endpoint device may be associated with an enterprise associated with the network. Additionally, or alternatively, the method 800 may include identifying a first service level agreement associated with the endpoint device. In some examples, the first service level agreement may indicate a first security capability associated with the enterprise. Additionally, or alternatively, the method 800 may include identifying a second service level agreement associated with an additional endpoint device associated with the enterprise and accessing the network. In some examples, the second service level agreement may indicate a second security capability associated with the enterprise. Additionally, or alternatively, the first security capability may be more favorable than the second security capability. Additionally, or alternatively, the method 800 may include evaluating the traffic flow from the endpoint device based at least in part on the first security capability. Additionally, or alternatively, the method 800 may include evaluating an additional traffic flow from the additional endpoint device based at least in part on the second security capability.

FIG. 9 illustrates a flow diagram of an example method 900 for a context-aware SASE engine 120 executing on a network edge device 114 associated with a computing resource network 102 to generate a security profile based on a default security profile received from a device associated with an enterprise network 104 and using the security profile to evaluate a traffic flow from an endpoint device 126 accessing the network 102.

At 902, the method 900 may include executing an edge security component on an edge network device of a network. In some examples, the edge security component may be configured as the SASE engine 120 as described with respect to FIGS. 1-7B. Additionally, or alternatively, the edge network device may be configured as the network edge node 114 as described with respect to FIGS. 1-7B. Additionally, or alternatively, the network may be configured as the computing resource network 102 and/or the enterprise network 104 as described with respect to FIGS. 1-7B.

At 904, the method 900 may include receiving a default security profile from an enterprise device associated with the network. In some examples, the default security profile may comprise a default set of security functions. In some examples, the default security profile may be configured as the default security profile as described with respect to FIGS. 1-7B. Additionally, or alternatively, the enterprise device may be associated with the enterprise network 104 as described with respect to FIGS. 1-7B.

At 906, the method 900 may include generating a security profile associated with an endpoint device accessing the network based at least in part on the default security profile. In some examples, the endpoint device may be configured as the endpoint device(s) as described with respect to FIGS. 1-7B. In some examples, generating the security profile may comprise any of the security profile generation techniques described herein with respect to FIGS. 1-7B. Additionally, or alternatively, the security profile may be configured as, but not limited to, any one of the example security profiles as described with respect to FIGS. 4A-7B.

At 908, the method 900 may include evaluating a traffic flow from the endpoint device using the security profile. In some examples, evaluating the traffic flow from the endpoint device may comprise any of the evaluating techniques described herein with respect to FIGS. 1-7B.

Additionally, or alternatively, the method 900 may include receiving endpoint information from the endpoint device. Additionally, or alternatively, the method 900 may include generating an additional security profile associated with the endpoint device accessing the network based at least in part on the endpoint information. Additionally, or alternatively, the method 900 may include evaluating the traffic flow from the endpoint device using the additional security profile.

Additionally, or alternatively, the method 900 may include receiving an intent from the endpoint device accessing the network. In some examples, the intent may indicate security details associated with at least one of the endpoint device, an application associated with the endpoint device, or a tenant associated with the endpoint device. Additionally, or alternatively, the method 900 may include identifying security capabilities associated with the intent. Additionally, or alternatively, the method 900 may include sending the security capabilities to the endpoint device. Additionally, or alternatively, the method 900 may include receiving an acceptance of the security capabilities from the endpoint device. Additionally, or alternatively, the method 900 may include generating a rule set associated with the endpoint device. In some examples, the rule set may be configured to enable the security capabilities for the endpoint device. Additionally, or alternatively, the method 900 may include evaluating the traffic flow from the endpoint device using the rule set.

Additionally, or alternatively, the method 900 may include allowing the traffic flow from the endpoint device based at least in part on the evaluating. Additionally, or alternatively, the method 900 may include denying the traffic flow from the endpoint device based at least in part on the evaluating.

Additionally, or alternatively, the method 900 may include generating a formatted security profile by compiling the security profile into a format that is executable by an additional edge network device of the network. Additionally, or alternatively, the method 900 may include sending the formatted security profile to the additional edge network device. Additionally, or alternatively, the method 900 may include evaluating the traffic flow from the endpoint device using the security profile by at least one of the edge network device, the additional edge network device, and/or the edge security component.

FIG. 10 illustrates a flow diagram of an example method 1000 for a context-aware SASE engine 120 executing on a network edge device 114 associated with a computing resource network 102 to generate a security profile specific to an endpoint device 126 accessing the network 102 and using the security profile to evaluate a traffic flow from the endpoint device 126.

At 1002, the method 1000 may include executing an edge security component on an edge network device of a network. In some examples, the edge security component may be configured as the SASE engine 120 as described with respect to FIGS. 1-7B. Additionally, or alternatively, the edge network device may be configured as the network edge node 114 as described with respect to FIGS. 1-7B. Additionally, or alternatively, the network may be configured as the computing resource network 102 and/or the enterprise network 104 as described with respect to FIGS. 1-7B.

At 1004, the method 1000 may include generating a security profile associated with an endpoint device accessing the network. In some examples, the security profile may be generated based at least in part on endpoint information received from the endpoint device. Additionally, or alternatively, the security profile may be generated based at least in part on a default security profile received from an enterprise device associated with an enterprise. In some examples, the endpoint device may be configured as the endpoint device(s) as described with respect to FIGS. 1-7B. In some examples, generating the security profile may comprise any of the security profile generation techniques described herein with respect to FIGS. 1-7B. Additionally, or alternatively, the security profile may be configured as, but not limited to, any one of the example security profiles as described with respect to FIGS. 4A-7B.

At 1006, the method 1000 may include evaluating a traffic flow from the endpoint device using the security profile. In some examples, evaluating the traffic flow from the endpoint device may comprise any of the evaluating techniques described herein with respect to FIGS. 1-7B.

Additionally, or alternatively, the method 1000 may include receiving endpoint information from the endpoint device accessing the network. Additionally, or alternatively, the method 1000 may include generating the security profile associated with the endpoint device based at least in part on the endpoint information.

Additionally, or alternatively, the method 1000 may include receiving a default security profile from an enterprise device associated with the network, the default security profile comprising a default set of security functions. Additionally, or alternatively, the method 1000 may include generating the security profile associated with the endpoint device based at least in part on the default security profile.

Additionally, or alternatively, the method 1000 may include receiving an intent from the endpoint device accessing the network. In some examples, the intent may indicate security details associated with at least one of the endpoint device, an application associated with the endpoint device, or a tenant associated with the endpoint device. Additionally, or alternatively, the method 1000 may include identifying security capabilities associated with the intent. Additionally, or alternatively, the method 1000 may include sending the security capabilities to the endpoint device.

Additionally, or alternatively, the method 1000 may include receiving an acceptance of the security capabilities from the endpoint device. Additionally, or alternatively, the method 1000 may include generating a rule set associated with the endpoint device. In some examples, the rule set may be configured to enable the security capabilities for the endpoint device. Additionally, or alternatively, the method 1000 may include evaluating the traffic flow from the endpoint device using the rule set.

Additionally, or alternatively, the method 1000 may include generating a formatted security profile by compiling the security profile into a format that is executable by an additional edge network device of the network. Additionally, or alternatively, the method 1000 may include sending the formatted security profile to the additional edge network device. Additionally, or alternatively, the method 1000 may include evaluating, by the additional edge network device, the traffic flow from the endpoint device using the security profile.

In some examples, evaluating the traffic flow from the endpoint device using the security profile may comprise evaluating the traffic flow by at least one of the edge security component or the edge network device.

Additionally, or alternatively, the method 1000 may include allowing the traffic flow from the endpoint device based at least in part on the evaluating. Additionally, or alternatively, the method 1000 may include denying the traffic flow from the endpoint device based at least in part on the evaluating.

Figure 11:
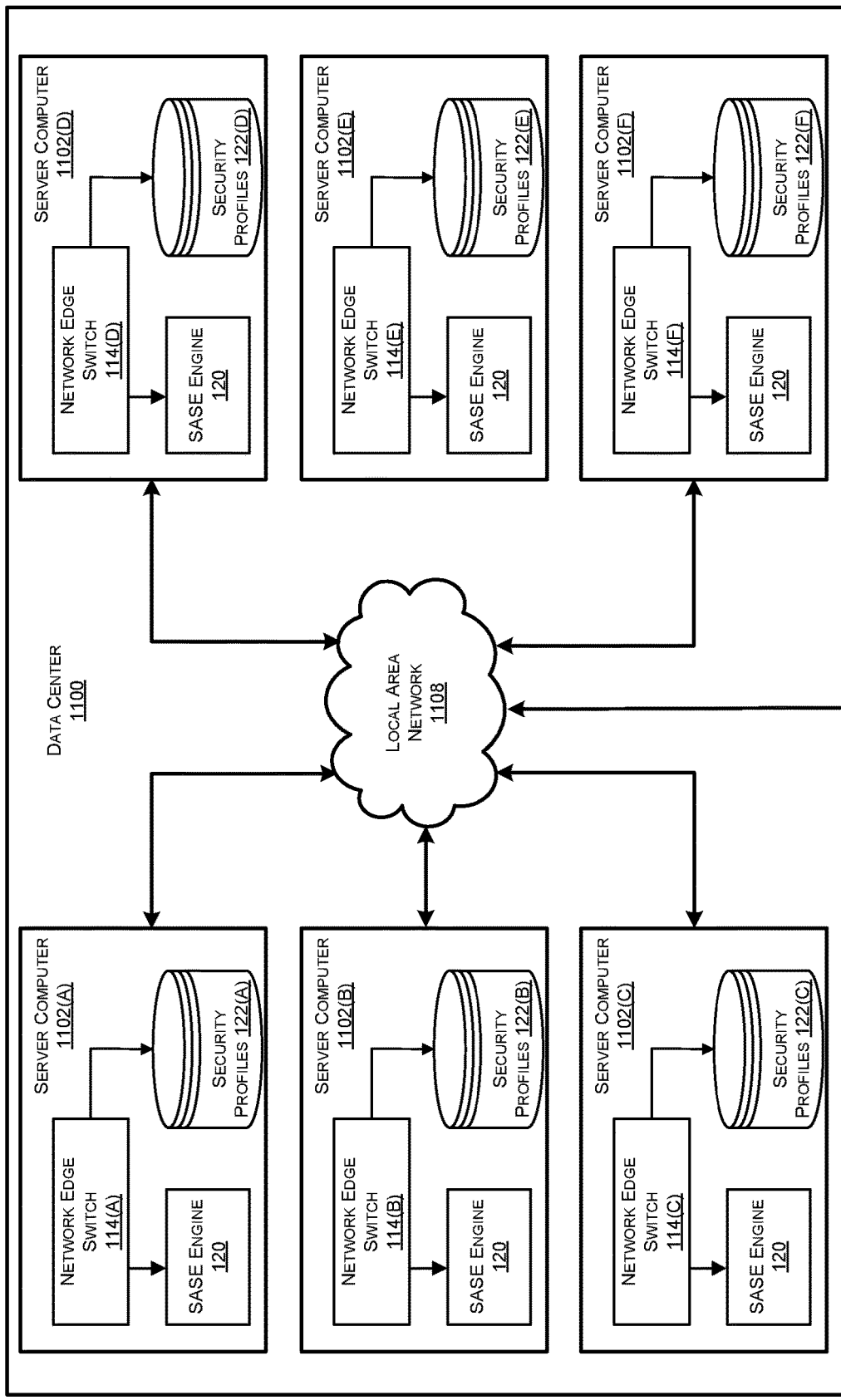
FIG. 11 illustrates a computing system diagram illustrating a configuration for a data center that can be utilized to implement aspects of the technologies disclosed herein.

FIG. 11 is a computing system diagram illustrating a configuration for a data center 1100 that can be utilized to implement aspects of the technologies disclosed herein. The example data center 1100 shown in FIG. 11 includes several server computers 1102A-1102E (which might be referred to herein singularly as "a server computer 1102" or in the plural as "the server computers 1102") for providing computing resources. In some examples, the server computers 1102 may include, or correspond to, the servers described herein with respect to FIG. 1.

The server computers 1102 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 1102 can also be configured to execute a resource manager capable of instantiating and/or managing the computing resources. In the case of VM instances, for example, the resource manager can be a hypervisor or another type of program configured to enable the execution of multiple VM instances on a single server computer 1102. Server computers 1102 in the data center 1100 can also be configured to provide network services and other types of services.

In the example data center 1100 shown in FIG. 11, an appropriate LAN 1108 is also utilized to interconnect the server computers 1102A-1102E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1100, between each of the server computers 1102A-1102E in each data center 1100, and, potentially, between computing resources in each of the server computers 1102. It should be appreciated that the configuration of the data center 1100 described with reference to FIG. 11 is merely illustrative and that other implementations can be utilized.

In some examples, the server computers 1102 may each execute one or more computing-based solutions 112 and/or the SASE engine 120, provisioned across a set or cluster of servers 1102. The computing-based solutions 112 on each server computer 1102 may support a single application or service, or multiple applications or services (for one or more users).

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 1100 (which might be referred to herein singularly as "a data center 1100" or in the plural as "the data centers 1100"). The data centers 1100 are facilities utilized to house and operate computer systems and associated components. The data centers 1100 typically include redundant and backup power, communications, cooling, and security systems. The data centers 1100 can also be located in geographically disparate locations. One illustrative embodiment for a data center 1100 that can be utilized to implement the technologies disclosed herein will be described below with regard to FIG. 11.

Figure 12:
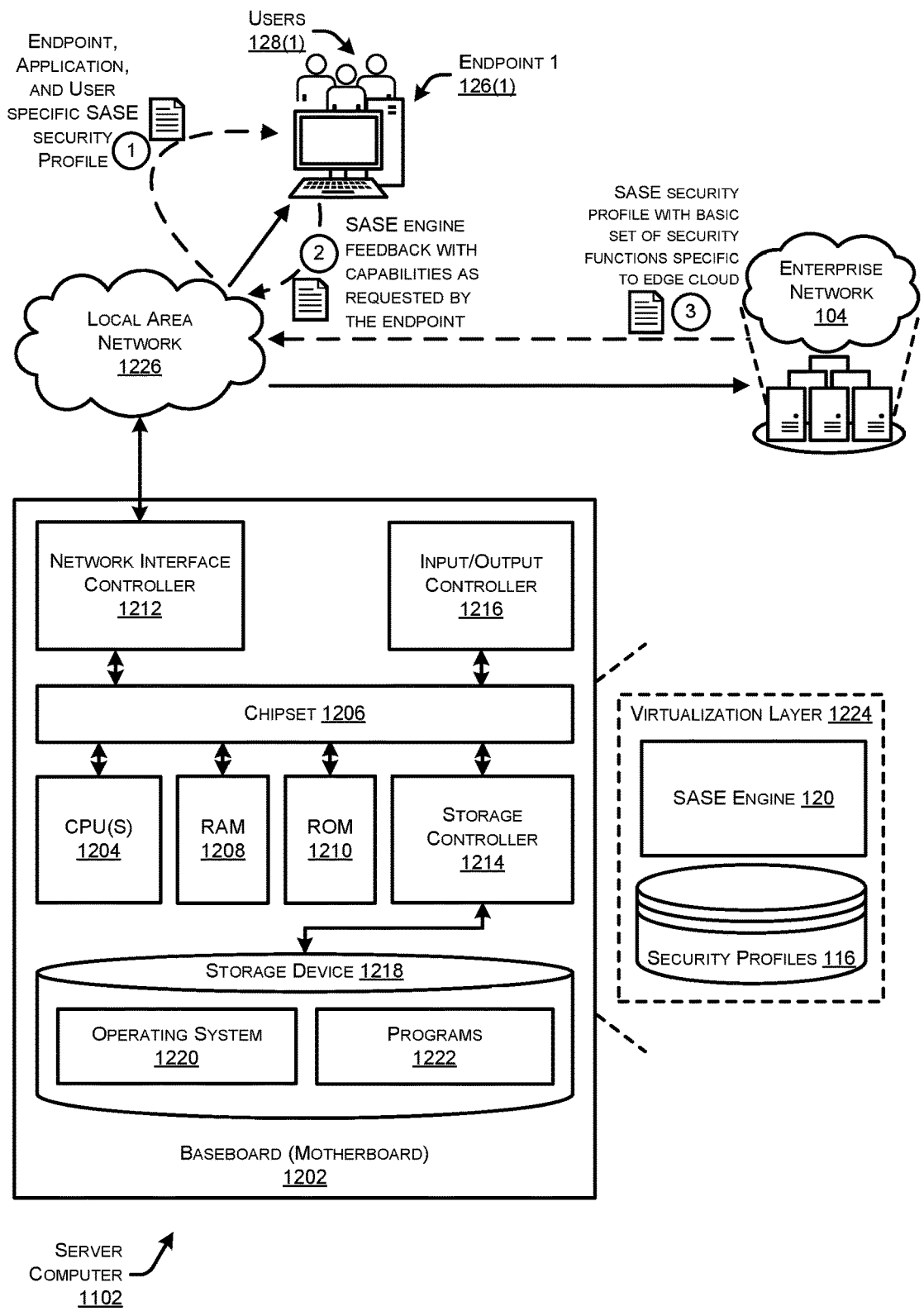
FIG. 12 is a computer architecture diagram showing an illustrative computer hardware architecture for implementing a server device that can be utilized to implement aspects of the various technologies presented herein.

FIG. 12 shows an example computer architecture for a computing device (or network switch) 1102 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. The computing device 1102 may, in some examples, correspond to a physical server 116 described herein with respect to FIG. 1.

The computing device 1102 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computing device 1102.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computing device 1102. The chipset 1206 can further provide an interface to a computer-readable storage medium such as a read-only memory ("ROM") 1210 or non-volatile RAM ("NVRAM") for storing basic routines that help to startup the computing device 1102 and to transfer information between the various components and devices. The ROM 1210 or NVRAM can also store other software components necessary for the operation of the computing device 1102 in accordance with the configurations described herein.

The computing device 1102 can operate in a networked environment using logical connections to remote computing devices and computer systems through a network, such as the network 1226. The chipset 1206 can include functionality for providing network connectivity through a NIC 1212, such as a gigabit Ethernet adapter. The NIC 1212 is capable of connecting the computing device 1102 to other computing devices over the network 1226 (or 138). It should be appreciated that multiple NICs 1212 can be present in the computing device 1102, connecting the computer to other types of networks and remote computer systems.

The computing device 1102 can be connected to a storage device 1218 that provides non-volatile storage for the computing device 1102. The storage device 1218 can store an operating system 1220, programs 1222, and data, which have been described in greater detail herein. The storage device 1218 can be connected to the computing device 1102 through a storage controller 1214 connected to the chipset 1206. The storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1102 can store data on the storage device 1218 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1218 is characterized as primary or secondary storage, and the like.

For example, the computing device 1102 can store information to the storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1102 can further read information from the storage device 1218 by detecting the physical states or characteristics of one or more particular locations within the physical storage units.

In addition to the mass storage device 1218 described above, the computing device 1102 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1102. In some examples, the operations performed by the computing resource network 102, and or any components included therein, may be supported by one or more devices similar to computing device 1102. Stated otherwise, some or all of the operations performed by the computing resource network 102, and or any components included therein, may be performed by one or more computing device 1102 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1218 can store an operating system 1220 utilized to control the operation of the computing device 1102. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 1218 can store other system or application programs and data utilized by the computing device 1102.

In one embodiment, the storage device 1218 or other computer-readable storage media is encoded with computer-executable instructions which, when loaded into the computing device 1102, transform the computer from a general-purpose computing system into a special-purpose computer capable of implementing the embodiments described herein. These computer-executable instructions transform the computing device 1102 by specifying how the CPUs 1204 transition between states, as described above. According to one embodiment, the computing device 1102 has access to computer-readable storage media storing computer-executable instructions which, when executed by the computing device 1102, perform the various processes described above with regard to FIGS. 1-10. The computing device 1102 can also include computer-readable storage media having instructions stored thereupon for performing any of the other computer-implemented operations described herein.

The computing device 1102 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computing device 1102 might not include all of the components shown in FIG. 11, can include other components that are not explicitly shown in FIG. 11, or might utilize an architecture completely different than that shown in FIG. 11.

The server computer 1102 may support a virtualization layer 1024, such as one or more computing-based solutions 112 executing on the server computer 1102. In some examples, the virtualization layer 1024 may be supported by a hypervisor that provides one or more virtual machines running on the server computer 1102 to perform functions described herein. The virtualization layer 1024 may generally support a virtual resource that performs at least portions of the techniques described herein. The network edge switch 114 may support a SASE engine 120 executing thereon, the SASE engine 120 and/or network edge switch 114 may send and receive various data and provide it to components. For instance, the SASE engine 120 may receive endpoint information from an endpoint 126 and/or a default security profile from an enterprise network 104 associated with the endpoint 126. The SASE engine 120 may generate an endpoint specific security profile based on the received data and may evaluate traffic flow(s) associated with the endpoint 126 based at least in part on one or more endpoint specific security profiles associated with the endpoint 126. Additionally, or alternatively, data may be exchanged between the SASE engine 120, the endpoint device 126, and/or the enterprise network 104 to implement a feedback loop to ensure that necessary security functions are applied as needed.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
executing a security component on a network device of a network;
receiving endpoint information from an endpoint device accessing the network, the endpoint device being associated with an enterprise associated with the network;
generating a security profile associated with the endpoint device based at least in part on the endpoint information;
identifying a first service level agreement associated with the endpoint device, the first service level agreement indicating a first security capability associated with the enterprise;
identifying a second service level agreement associated with an additional endpoint device associated with the enterprise and accessing the network, the second service level agreement indicating a second security capability associated with the enterprise, wherein the first security capability is more favorable than the second security capability; and
evaluating at least one of:
a traffic flow from the endpoint device using the security profile;
the traffic flow from the endpoint device based at least in part on the first security capability; or
an additional traffic flow from the additional endpoint device based at least in part on the second security capability.

2. The method of claim 1, further comprising:
receiving an intent from the endpoint device accessing the network, the intent indicating security details associated with at least one of the endpoint device, an application associated with the endpoint device, or a tenant associated with the endpoint device;
identifying second security capabilities associated with the intent; and
sending the second security capabilities to the endpoint device.

3. The method of claim 2, further comprising:
receiving an acceptance of the second security capabilities from the endpoint device;
generating a rule set associated with the endpoint device, the rule set configured to enable the second security capabilities for the endpoint device; and
evaluating the traffic flow from the endpoint device using the rule set.

4. The method of claim 1, further comprising:
generating a formatted security profile by compiling the security profile into a format that is executable by an additional network device of the network;
sending the formatted security profile to the additional network device; and
evaluating, by the additional network device, the traffic flow from the endpoint device using the formatted security profile.

5. The method of claim 1, wherein evaluating the traffic flow from the endpoint device using the security profile comprises evaluating the traffic flow by at least one of the security component or the network device.

6. The method of claim 1, further comprising:
allowing the traffic flow from the endpoint device based at least in part on the evaluating; or
denying the traffic flow from the endpoint device based at least in part on the evaluating.

7. The method of claim 1, the operations further comprising:
receiving a default security profile from an enterprise device associated with the network, the default security profile comprising a default set of security functions; and generating the security profile associated with the endpoint device based at least in part on the default security profile.

8. A method comprising:

executing a security component on a network device of a network;

receiving a default security profile from an enterprise device associated with the network, the default security profile comprising a default set of security functions;

generating a security profile associated with an endpoint device accessing the network based at least in part on the default security profile;

receiving an intent from the endpoint device accessing the network, the intent indicating security details associated with at least one of the endpoint device, an application associated with the endpoint device, or a tenant associated with the endpoint device;

identifying security capabilities associated with the intent;

sending the security capabilities to the endpoint device;

receiving an acceptance of the security capabilities from the endpoint device;

generating a rule set associated with the endpoint device, the rule set configured to enable the security capabilities for the endpoint device; and evaluating a traffic flow from the endpoint device using one of the security profile or the rule set.

9. The method of claim 8, further comprising:

receiving endpoint information from the endpoint device;

generating an additional security profile associated with the endpoint device accessing the network based at least in part on the endpoint information; and evaluating the traffic flow from the endpoint device using the additional security profile.

10. The method of claim 8, further comprising:

allowing the traffic flow from the endpoint device based at least in part on the evaluating; or denying the traffic flow from the endpoint device based at least in part on the evaluating.

11. The method of claim 8, further comprising:

generating a formatted security profile by compiling the security profile into a format that is executable by an additional network device of the network;

sending the formatted security profile to the additional network device; and evaluating, by the additional network device, the traffic flow from the endpoint device using the formatted security profile.

12. The method of claim 8, wherein evaluating the traffic flow from the endpoint device using the security profile comprises evaluating the traffic flow by at least one of the security component or the network device.

13. A system comprising:

one or more processors; and one or more non-transitory computer-readable media storing computer-executable instructions that, when executed by the one or more processors, cause the one or more processors to perform operations comprising:

executing a security component on a network device of a network;

generating a security profile associated with an endpoint device accessing the network, the endpoint device being associated with an enterprise associated with the network;

identifying a first service level agreement indicating a first security capability associated with the enterprise; identifying a second service level agreement indicating a second security capability associated with the enterprise, wherein the first security capability is more favorable than the second security capability;

determining that the endpoint device is associated with the first service level agreement; and evaluating a traffic flow from the endpoint device using at least one of the security profile or the first security capability.

14. The system of claim 13, the operations further comprising:

receiving endpoint information from the endpoint device accessing the network; and generating the security profile associated with the endpoint device based at least in part on the endpoint information.

15. The system of claim 13, the operations further comprising:

receiving a default security profile from an enterprise device associated with the network, the default security profile comprising a default set of security functions; and generating the security profile associated with the endpoint device based at least in part on the default security profile.

16. The system of claim 13, the operations further comprising:

receiving an intent from the endpoint device accessing the network, the intent indicating security details associated with at least one of the endpoint device, an application associated with the endpoint device, or a tenant associated with the endpoint device;

identifying security capabilities associated with the intent; and sending the security capabilities to the endpoint device.

17. The system of claim 16, the operations further comprising:

receiving an acceptance of the security capabilities from the endpoint device;

generating a rule set associated with the endpoint device, the rule set configured to enable the security capabilities for the endpoint device; and evaluating the traffic flow from the endpoint device using the rule set.

18. The system of claim 13, the operations further comprising:

generating a formatted security profile by compiling the security profile into a format that is executable by an additional network device of the network;

sending the formatted security profile to the additional network device; and evaluating, by the additional network device, the traffic flow from the endpoint device using the formatted security profile.

19. The system of claim 13, wherein evaluating the traffic flow from the endpoint device using the security profile comprises evaluating the traffic flow by at least one of the security component or the network device.

20. The system of claim 13, the operations further comprising at least one of:

allowing the traffic flow from the endpoint device based at least in part on the evaluating; or denying the traffic flow from the endpoint device based at least in part on the evaluating.

* * * * *